(12) United States Patent
Ivey et al.

(10) Patent No.: US 6,797,409 B2
(45) Date of Patent: Sep. 28, 2004

(54) ELECTRODEPOSITION PROCESS AND A LAYERED COMPOSITE MATERIAL PRODUCED THEREBY

(75) Inventors: Douglas G. Ivey, Edmonton (CA); Barbara M. Djurfors, Edmonton (CA); Jacobus Cornelius Doesburg, Westbury, NY (US)

(73) Assignee: The Governors of the University of Alberta, Edmonton (CA)

(*) Notice: Subject to any disclaimer, the term of this patent is extended or adjusted under 35 U.S.C. 154(b) by 42 days.

(21) Appl. No.: 10/029,456

(22) Filed: Dec. 21, 2001

(65) Prior Publication Data

US 2003/0134142 A1 Jul. 17, 2003

(30) Foreign Application Priority Data

Dec. 20, 2001 (CA) .............................. 2365749

(51) Int. Cl.⁷ .............................................. B32N 15/01

(52) U.S. Cl. ....................... 428/635; 428/646; 428/672; 428/935

(58) Field of Search ................................ 425/615, 635, 425/646, 672, 935

(56) References Cited

U.S. PATENT DOCUMENTS

| | | | |
|---|---|---|---|
| 3,216,806 A | * | 11/1965 | Sama et al. ................. 428/651 |
| 3,396,454 A | * | 8/1968 | Murdock et al. ........ 228/180.1 |
| 4,391,679 A | | 7/1983 | Zilske et al. |
| 4,869,971 A | * | 9/1989 | Nee et al. .................... 428/635 |
| 4,936,927 A | * | 6/1990 | Grunke et al. ............... 148/549 |
| 5,197,654 A | * | 3/1993 | Katz et al. ............... 228/124.1 |
| 5,277,790 A | | 1/1994 | Morrissey |
| 5,902,472 A | | 5/1999 | Arai et al. |
| 6,245,208 B1 | | 6/2001 | Ivey et al. |

FOREIGN PATENT DOCUMENTS

| | | |
|---|---|---|
| CA | 2268867 | 10/2000 |
| DE | 4406434 | 8/1995 |
| JP | 56 136994 | 10/1981 |
| JP | 58-100993 | * 6/1983 |
| JP | 61 15992 | 4/1994 |
| JP | 2001-271127 | * 10/2001 |
| WO | WO 98/03700 | 1/1998 |

OTHER PUBLICATIONS

Kallmayer, C. et al., "Fluxless Flip–Chip Attachment Techniques Using the Au/Sn Metallurgy," IEEE/CPMT International Electronics Manfacutring Technology Symposium, 1995, pp. 20–28 (no month).

Kallmayer, C. et al., "Fluxless Flip–Chip Soldering Using the Eutectic Gold–Tin System—A Comparison between Self–Alignment and Thermode–Bonding," 10th European Microelectronics Conference, Apr. 1995, pp. 440–449.

Zakel, E. and Reichl, Herbert, "Flip–Chip Assembly Using Gold, Gold–Tin, and Nickel–Gold Metallury," Flip–Chip Technologies, ed., J. Lau, McGraw–Hill, (1995), pp. 415–468 (no month).

(List continued on next page.)

Primary Examiner—John J. Zimmerman
(74) Attorney, Agent, or Firm—Terrence N. Kuharch; Rodman & Rodman

(57) ABSTRACT

An electrodeposition process for producing a layered composite material and the layered composite material produced by the process. The layered composite material includes at least one layer of a first alloy species of an alloy and at least one layer of a second alloy species of the alloy. The first alloy species and the second alloy species have distinguishable properties. The process includes the steps of first energizing an electroplating circuit to provide a first electroplating current to deposit a layer of the first alloy species and second energizing the electroplating circuit to provide a second electroplating current to deposit a layer of the second alloy species. The alloy is preferably a gold-tin alloy, the first alloy species is preferably the $Au_5Sn$ alloy phase and the second alloy species is preferably the AuSn alloy phase.

6 Claims, 23 Drawing Sheets

OTHER PUBLICATIONS

Mason, D.R. et al., "Alloy Gold Deposits: Have They Any Industrial Use?" Transactions of the Institute of Metal Finishing, 1974, vol. 52, pp. 143–148.

Raub, E. and Bihlmaier, K., "Galvanische Weissgoldniederschtage," Mitteilungen Des Forschungsinstituts und Probieramts fur Edelmetalle an der Staatl. 11 Jahrgang, Nr. 7/8, Okt./Nov. 1937, pp. 59–71.

Kubota, N. et al., "Electrodeposition of Gold–Tin Alloys from the Pyrophosphate Solution," J. Met. Fin. Soc. Japan, 34 (1983) No. 1, pp. 37–43 (no month).

Tanabe, Y. et al., "On the Microstructure and the Phase of Electrodeposition Au–Sn and Ag–Sn Alloys," J. Met. Fin. Soc. Japan, 34 (1983) No. 9, pp. 8–15 (no month).

Kubota, N., et al., "Conductivity and Ion Transport In Gold–Tin Pyrophosphate Baths," Plating and Surface Finishing, 71 (1984) Mar., pp. 46–49.

* cited by examiner 2.0 mA/cm²

2.8 mA/cm²

4 μm 3.2 mA/cm²

ELECTRODEPOSITION PROCESS AND A LAYERED COMPOSITE MATERIAL PRODUCED THEREBY

TECHNICAL FIELD

A layered composite material comprised of layers of an alloy and a process for producing the layered composite material.

BACKGROUND OF THE INVENTION

Gold-tin (Au—Sn) eutectic solders are commonly used in the optoelectronic and microelectronic industries for chip bonding to dies. Au—Sn solder is classified as a "hard solder" with superior mechanical and thermal properties relative to "soft" solders, such as the Pb—Sn system.

Au—Sn solder can be applied in a number of ways, i.e., as Au—Sn preforms, solder paste, by sequential evaporation and sequential electrodeposition. Compared with solder preforms and pastes, evaporated solder is cleaner and provides more precise thickness and positional control. Thin film technology, however, involves expensive vacuum systems.

Electroplating of Au—Sn eutectic solder is an attractive alternative in that it is a low cost process, offering the thickness and positional control of thin film techniques. Au—Sn solder layers have been produced sequentially by depositing Au first on a seed layer, followed by Sn (see for example C. Kallmayer, D. Lin, J Kloeser, H. Oppermann, E. Zakel and H. Reichl, 1995 *IEEE/CPMT International Electronics Manufacturing Technology Symposium*, (1995) 20; C. Kallmayer, D. Lin, H. Oppermann, J. Kloeser, S. Werb, E. Zakel and H. Reichl, $10^{th}$ *European Microelectronics Conference*, (1995) 440; and E. Zakel and H. Reichl, Chapter 15, in *Flip-Chip Technologies*, ed., J. Lau, McGraw-Hill, (1995) 415.

Commercially available Au and Sn baths are utilized from which several microns of solder can be deposited sequentially. Co-electrodeposition or codeposition of Au and Sn from a single solution offers the same economic advantage of sequential plating relative to vacuum deposition techniques, as well as the prospect of depositing the solder in a single step without oxidation of an outer Sn layer.

One of the challenges with Au—Sn alloy plating baths is preventing the oxidation of Sn(II) to Sn(IV), as discussed in D. R. Mason, A. Blair and P. Wilkinson, *Trans. Inst. Met. Finish.*, 52 (1974) 143. Oxidation of Sn can be minimized by using soluble Sn anodes. However, Au is deposited on the anodes unless they are isolated by semi-permeable diaphragms.

It has been reported that Au—Sn alloys containing up to 30 at (i.e. atomic) % Sn could be deposited from baths containing no free cyanide, and containing the Sn as its stannate complex formed with KOH (see E. Rau and K. Bihlimaier, *Galvanische Weissgolniederschlage, Mitt. Forschungsinst. Probierants. Edelmetalle Staatl. Hoheren Fachschule Schwab. Gmund*, 11 (1937) 59. Later claims concerning Au—Sn alloy plating, however, have been based on the use of alkaline and acid cyanide electrolytes, where Sn in many cases has been incorporated with the goal of obtaining brightening effects rather than producing deposits with significant amounts of Sn.

Several cyanide based systems have been reported (see T. Frey and W. Hempel, DE 4406434, (1995); W. Kuhn, W. Zilske and A.-G. Degussa, Ger. DE 4,406,434, Aug. 10, 1995: N Kubota, T. Horikoshi and E. Sato, *J. Met. Fin. Soc. Japan*, 34 (1983) 37; and Y. Tanabe, N. Hasegawa and M. Odaka, *J. Met. Fin. Soc. Japan*, 34 (1983) 8.

Frey and Hempel developed a bright Au—Sn plating bath with a pH of 3–14, comprised of potatassium dicyanoaurate, soluble Sn(IV), potassium hydroxide, potassium salt of gluconic, glucaric and/or glucaronic acid, conductivity salt, piperazine and a small amount of As. The bath was used to plate small parts with an alloy containing 5–25 wt % Sn. Bright deposits were obtained for thicknesses greater than 0.1 µm and the solution exhibited long term stability without the use of soluble Sn anodes.

A.-G. Degussa, Ger. DE 4,406,434 teaches using potassium dicyanoaurate and tin chloride and claims a deposit composition of 8 wt % Sn and thickness of 5 µm.

Au—Sn codeposition from a cyanide system using pyrophosphate as a buffering agent was studied by Kubota et al (N. Kubota, T. Horikoshi and E. Sato, *J. Met. Fin. Soc. Japan*, 34 (1983) 37; and N. Kubota, T. Horikoshi and E. Sato, *Plating and Surface Finishing*, 71 (1984) 46. The basic formula consisted of $K_4P_2O_7$, $KAu(CN)_2$ and $SnCl_2$—$2H_2O$. The mass transfer was investigated to clarify reaction mechanisms between monovalent Au or bivalent Sn and pyrophosphate ions, by measuring conductivity, kinematic viscosity and limiting current density of the bath components. Two pyrophosphate ions were complexed with one stannous ion, with excess pyrophosphate acting as a supporting constituent.

Tanabe et al, referred to above, obtained various Au—Sn alloy compositions by electrodeposition from cyanide baths containing $HAuCl_4$—$4H_2O$, $K_2SnO_3$—$3H_2O$, KCN and KOH. Although a linear relationship was not found between the Sn content in the bath and the Sn content in the alloy formed, a relationship was found between the two alloys which permitted formation of alloys of desired compositions. The composition of electrodeposited Au—Sn was shifted by about 10% to the Sn side in comparison with alloys at thermal equilibrium; thus exhibiting the $\zeta$ phase in the 25–29 at % range. AuSn, $AuSn_2$ and $AuSn_4$ were also electrodeposited.

Gold chloride electrolytes were used in the early days of Au plating, but today are employed almost exclusively in the electrochemical refining of Au. An extensive investigation of the cathodic behaviour of Au in chloride solutions has shown that the quality of the cathode deposit is strongly influenced by the relative amounts of Au(I) and Au(III) in the solution. The reduction of Au(III) chloride to the metal can be expected to involve the formation of Au(I) as an intermediate species. Under plating conditions, Au will be deposited from both the Au(III) and Au(I) species. Since Au(I) has a more positive plating potential (1.154 V) than Au(III) (1.002 V), a limiting current density for Au(I) will be reached first and it can be expected that the deposits will be of relatively poor quality, i.e., they tend to be bulky and porous. Gold fines will be present in the solution as a result of the following disproportionation reaction:

$$3AuCl_2^- = 2Au + AuCl_4^- + 2Cl^-$$

Detailed studies of the anodic and cathodic reactions have shown that the use of low temperatures and periodic interruption of the current are major factors that can contribute to reduced Au(I) concentration.

Japanese Patent JP 56 136994 to Masayoshi Mashiko describes a process carried out under alkaline conditions and employing a bath composition containing gold, tin and copper and sodium sulphite or potassium sulphite was used as a stabilizer for the gold.

Japanese Patent to S. Matsumoto and Y. Inomata, JP 61 15,992 [86 15.992], (Jan. 24, 1986) discloses a Au—Sn plating bath (pH=3–7) containing KauCl$_4$, SnCl$_2$, triammonium citrate, L-ascorbic acid, NiCl$_2$ and peptone. A 7 $\mu$m Au—Sn alloy (20±2 wt % Sn) layer was plated out on a 50 mm diameter Si wafer at 208° C. and a current density of 0.6 A/dm$^2$ in 30 minutes using a Pt coated non-consumable Ti anode. The stability of the bath seemed to be the weak link in this process as stability decreased dramatically when the Sn salt was added.

U.S. Pat. No. 6,245,208 (Ivey et al), issued on Jun. 12, 2001 describes a relatively stable, weakly acidic, non-cyanide electroplating solution for codeposition of Au—Sn alloys over a range of compositions, including the technologically important eutectic and near eutectic compositions. In the preferred embodiment, the solution consists of Au and Sn chloride salts, as well as ammonium citrate as a buffering agent and sodium sulphite and L-ascorbic acid as stabilizers.

Ivey et al discusses the use of both direct current and pulsed current power sources and describes relationships between Sn content and average current density, Sn content and pulsed current "ON time", and Sn content and pulsed current "OFF time". These relationships indicate that within certain ranges, the Sn content of the resulting Au—Sn alloy will increase with an increase in average current density, pulsed current ON time, and pulsed current OFF time.

Ivey et al also discusses the effect of current density, pulsed current "ON time" and pulsed current "OFF time" upon the quality of the alloy deposit and provides some guidance for optimizing the electroplating process to obtain an alloy deposit of desired composition and quality.

Ivey et al contemplates the application of direct current or pulsed current at a single value of electroplating current density to produce an alloy deposit having a desired Sn content. Unfortunately, however, the relationships amongst the variables, although predictive, are subject to significant scatter due to numerous influences, such as edge effects, local current effects etc. As a result, the exact Sn content of the Au—Sn alloy deposit in Ivey et al is in practice somewhat difficult to control.

As a result, there remains in the art of alloy electrodeposition a need for an electrodeposition process which is capable of providing relatively precise control over the composition or other properties of the alloy deposit.

Preferably this process should be applicable to the electrodeposition of many different alloy systems, including but not limited the gold-tin alloy system.

SUMMARY OF THE INVENTION

The present invention is based upon the broad principle that by varying an electroplating current, it is possible to electrodeposit alloy species with distinguishable properties in a controlled manner.

In one aspect the invention is therefore directed at an electrodeposition process for separately depositing layers of at least two alloy species of an alloy to produce a layered composite material. The invention is also directed at a layered composite material comprising a layer of a first alloy species and a layer of a second alloy species, wherein the first alloy species and the second alloy species have distinguishable properties.

The distinguishable properties of the alloy species are due to different alloy phases or combinations of alloy phases being deposited in the alloy species. The invention is therefore applicable to any alloy system in which the alloy is capable of electrodeposition in two or more alloy phases and in which the identity of the electrodeposited alloy phase or phases is dependent upon the electroplating current.

In this specification, the terms "alloy" and "alloy system" indicate substances containing two or more essential elements which are defined by their essential elements and the term "alloy phase" describes a particular form or phase of a substance which contains the essential elements of the alloy or alloy system. For example, the gold-tin alloy or alloy system contains gold and tin as essential elements and may be produced in several different alloy phases, including for example Au$_5$Sn or AuSn.

In this specification, the term "alloy species" indicates a substance which is electrodeposited by the process using a specific electroplating current, which substance may be comprised of one alloy phase or a combination of alloy phases.

More particularly, the invention may be applied to any alloy system in which two or more alloy phases of the alloy can be selectively electrodeposited by controlling the electroplating current so that an alloy can be electrodeposited as a layered composite material of two or more alloy species which together contain two or more alloy phases. The properties of each particular alloy species are controlled by controlling the electroplating current. The layered composite material is therefore comprised of two or more alloy species and the overall properties of the layered composite material are dependent upon the properties and relative proportions of the different alloy species.

A single alloy species will include those alloy phases of the alloy which are electrodeposited at a selected electroplating current so that a single alloy species may be comprised of one or more alloy phases. Preferably, however, a selected electroplating current electrodeposits primarily or essentially a single alloy phase so that any particular alloy species consists primarily or essentially of a single alloy phase.

Regardless of whether a selected electroplating current deposits one alloy phase or more than one alloy phase, a selected electroplating current should preferably result in the electrodeposition of an alloy species which has consistent properties which are distinguishable from the properties of alloy species which are electrodeposited at a different selected electroplating current. This will facilitate the combination of layers of different alloy species to produce a layered composite material having desired properties.

There is no upper limit to the total number of layers which may make up the layered composite material and the layered composite material may be comprised of as few as two layers.

Regardless of the total number of layers which make up the layered composite material, there should preferably be one or more layers of at least two different alloy species, which alloy species have different properties. The layered composite material is preferably comprised of a plurality of layers of each alloy species.

The layered composite material may be comprised of as few as two alloy phases. Although theoretically there is no maximum number of alloy phases which may be deposited in the various layers of different alloy species, the number of alloy phases present in the layered composite material should preferably be minimized.

Similarly, the layered composite material may be comprised of as few as two alloy species, and although theoretically there is no maximum number of alloy species which may be deposited in the various layers, the number of alloy species present in the layered composite material should preferably be minimized.

The layered composite material is therefore most preferably comprised of two different alloy species, a plurality of layers of each alloy species, and with each alloy species consisting primarily or essentially of a single alloy phase.

The invention may also be applied to the production of an alloy deposit which comprises a single layer of a single alloy species instead of a layered composite material comprised of a plurality of layers of different alloy species. This single alloy species may be comprised of as few as two alloy phases, and although theoretically there is no maximum number of alloy phases which make up the single alloy species, the number of alloy phases comprising the single alloy species should preferable be minimized. Where the invention is applied to the production of a single layer alloy deposit instead of a layered composite material, the single alloy species is most preferably comprised of two different alloy phases.

In a preferred process aspect of the invention, the invention is an electrodeposition process for producing a layered composite material comprised of layers of an alloy, the process using an electroplating circuit comprising a power supply, an electroplating solution comprising ions of the elements comprising the alloy, and an electrodeposition substrate, the process comprising the following steps:

(a) first energizing the electroplating circuit with the power supply to provide a first electroplating current in the electroplating circuit during a first current plating time interval to deposit a layer of a first alloy species of the alloy on the substrate, the first alloy species having first alloy species properties; and (b) second energizing the electroplating circuit with the power supply to provide a second electroplating current in the electroplating circuit during a second current plating time interval to deposit a layer of a second alloy species of the alloy on the substrate, the second alloy species having second alloy species properties;

wherein the first alloy species properties are distinguishable from the second alloy species properties.

In a preferred product aspect of the invention, the invention is a layered composite material comprising a layer of a first alloy species of an alloy, the first alloy species having first alloy species properties, and further comprising a layer of a second alloy species of the alloy, the second alloy species having second alloy species properties, wherein the first alloy species properties are distinguishable from the second alloy species properties.

The alloy species properties are distinguishable with respect to one or more properties so that by controlling the deposition of each alloy species, the properties of the layered composite material can be controlled by taking advantage of the different properties of the alloy species. The different property or properties of the alloy species may relate to any chemical or physical property. For example, the distinguishing property may be the chemical composition of the alloy species.

Preferably the first alloy species consists essentially of a first alloy phase and preferably the second alloy species consists essentially of a second alloy phase.

The first alloy phase and the second alloy phase will therefore be distinguishable with respect to one or more chemical or physical properties. Preferably the first alloy phase has a first alloy phase composition, the second alloy phase has a second alloy phase composition, and the first alloy phase composition is different from the second alloy phase composition.

The first alloy species and the second alloy species are combined in the layered composite material so that the layered composite material has composite material properties, including a composite material composition. The composite material properties include any chemical or physical properties. The composite material properties will depend upon the first alloy species properties, the second alloy species properties and the relative proportions of the first alloy species and the second alloy species comprising the layered composite material.

The first electroplating current and the second electroplating current may each either be a direct current or a pulsed current. Preferably the first electroplating current and the second electroplating current are both a direct current or both a pulsed current.

The first electroplating current and the second electroplating current are selected having regard to the particular alloy system and the particular electroplating process. The selection of the characteristics of the electroplating currents is guided by an understanding of the relationships between the properties of deposited alloys and electroplating current. Procedures for determining these relationships are taught in U.S. Pat. No. 6,245,208 (Ivey et al) with respect to the gold-tin alloy system. These relationships can be established easily for other alloy systems using the same general procedures.

The first electroplating current is preferably selected so that the first alloy species consists essentially of a first alloy phase and the second electroplating current is preferably selected so that the second alloy species consists essentially of a second alloy phase.

The relative proportions in the layered composite material of the first alloy species and the second alloy species will be dependent upon the first current plating time interval and the second plating time interval. As a result, the first current plating time interval and the second current plating time interval may be selected so that the layered composite material has a desired composite material composition which is obtained by combining the first alloy species and the second alloy species.

The alloy produced by the invention may be any alloy system which may be electrodeposited in different alloy species, which alloy species are dependent upon the electroplating current.

A preferred alloy system for use in the invention is the gold-tin alloy system. Within the gold-tin alloy system, the preferred alloy phases for use in the invention are $Au_5Sn$ and AuSn.

The reason $Au_5Sn$ and AuSn are preferred alloy phases is because a particularly desirable alloy composition for the optoelectronic and microelectronic industries is the eutectic gold-tin alloy composition, which comprises about 30 at % tin. $Au_5Sn$ comprises about 15 at % tin and AuSn comprises 50 at % tin. As a result, it can be readily seen that a combination of $Au_5Sn$ and AuSn can readily produce a layered composite material which has a composite material composition comprising anywhere between 15 at % tin and 50 at % tin, thus including the eutectic composition as well as near-eutectic compositions.

For example, by selection of the first current plating time interval and the second current plating time interval, $Au_5Sn$ and AuSn can be electrodeposited as a layered composite material to provide a composite material composition of anywhere between about 15 at % tin and 50 at % tin, including between about 25 at % tin and about 40 at % tin, between about 27 at % tin and about 35 at % tin, as well as the eutectic composition.

Where the alloy system is the gold-tin alloy system, the first alloy species therefore consists primarily or essentially of a first alloy phase $Au_5Sn$ and the second alloy species consists primarily or essentially of a second alloy phase AuSn.

Electroplating current density is a measure of electroplating current per unit area of electrodeposition substrate. In direct current applications, average current density and peak current density are the same. In pulsed current applications, average current density is a function of peak current density and duty cycle, and duty cycle is a function of electroplating current ON time and pulse cycle period.

It has been discovered that the relationship between average current density and alloy phase in the gold-tin alloy system is such that an average current density of less than or equal to about 1 mA/cm² will result in the electrodeposition of an alloy species which consists essentially of $Au_5Sn$, while an average current density of greater than or equal to about 2 mA/cm² will result in the electrodeposition of an alloy species which consists essentially of AuSn. It has also been discovered that an average current density within a range of between about 1 mA/cm² and 2 mA/cm² will result in a mixture of $Au_5Sn$ and AuSn which varies greatly within that range.

Preferably the first electroplating current and the second electroplating current which are used with the gold-tin alloy system are both pulsed currents. Where the electroplating currents are pulsed currents, the pulsed current ON time, pulsed current OFF time and peak current density are selected first, to provide a suitable average current density to facilitate the electrodeposition of the desired alloy species and alloy phases and second, to provide an alloy deposit which has a suitable quality in terms of grain size and structure.

Fine grained and smooth alloy deposits are generally preferred over coarse grained and rough alloy deposits. The following general trends in alloy electrodeposition are noted:

1. grain structures tend to become less coarse as either average current density or peak current density increase, for current density values below a limiting current density value;
2. grain structures tend to become more coarse as either average current density or peak current density exceed a limiting current density value;
3. grain structures tend to become more coarse with increasing pulsed current ON times; and
4. grain structures tend to become less coarse with increasing pulsed current OFF times.

The limiting current density values for any particular alloy system can easily be determined. In the case of the gold-tin alloy system, it has been found that preferred ranges for the characteristics of the first electroplating current and the second electroplating current are as follows:

| | |
|---|---|
| pulsed current ON time: | greater than or equal to about 2 milliseconds per pulse cycle, most preferably about 2 milliseconds per pulse cycle; |
| pulsed current OFF time: | greater than or equal to about 4 milliseconds per pulse cycle, most preferably about 8 milliseconds per pulse cycle; |
| pulse cycle period: | about 6 milliseconds to about 12 milliseconds, most preferably about 10 milliseconds. |

The electroplating solution may be any electrolytic solution which includes a suitable solvent containing ions of the elements comprising the alloy or alloy system and which has been suitably stabilized for use as an electroplating solution so that it is capable of codepositing the elements of the alloy or alloy system as two or more alloy species.

As previously indicated, one of the preferred alloy systems for use with the invention is the gold-tin alloy system.

In the gold-tin alloy system, a preferred electroplating solution comprises ammonium citrate, a salt of gold soluble in the ammonium citrate, a salt of tin soluble in the ammonium citrate, a gold stabilizer and a tin stabilizer.

Preferably the gold salt is a gold chloride and the tin salt is a tin chloride. More preferably the gold salt is potassium gold chloride ($KAuCl_4$) and the tin salt is tin chloride ($SnCl_2$).

Preferably the gold salt is present in the electroplating solution in the amount of between about 5 g/L and about 15 g/L and the tin salt is present in the amount of between about 5 g/L and about 15 g/L.

Preferably the ratio of gold to tin in the electroplating solution is in the range of about 0.5 to about 3.0 (by weight).

Preferably the gold and the tin are present in a ratio to form the alloy phases $Au_5Sn$ and AuSn and are present in a ratio conducive to producing a layered composite material which may contain anywhere between about 15 at % Sn and about 50 at % Sn.

The gold stabilizer and the tin stabilizer may be any substances which will improve the stability of the electroplating solution and facilitate electrodeposition of the layered composite material. Exemplary gold stabilizers include sodium sulfides such as $Na_2SO_3$ (sodium sulphite) and $Na_2S_2O3$, with $Na_2SO_3$ (sodium sulphite) being most preferred, particularly where the gold salt is $KAuCl_4$. A preferred tin stabilizer is ascorbic acid, and in particular L-ascorbic acid.

The preferred electroplating solution may, for example, be prepared in accordance with the method described in U.S. Pat. No. 6,245,208 (Ivey et al) by dissolving a suitable tin salt in ammonium citrate to form a tin solution, dissolving a suitable gold salt in ammonium citrate to form a gold solution, and then combining and mixing the tin solution and the gold solution.

Preferably the gold stabilizer is added to the gold solution and the tin stabilizer is added to the tin solution before the gold and tin solutions are combined.

The layers of the layered composite material may be any thickness, as determined by the lengths of the plating time intervals. Preferably the thickness of the layers is kept relatively small so that the alloy species and alloy phases in the various layers will approximate a homogeneous or completely interspersed structure. Most preferably the thickness of the layers ranges from submicron dimensions (<10 nm) to several microns.

BRIEF DESCRIPTION OF DRAWINGS

Embodiments of the invention will now be described with reference to the accompanying drawings, in which.

DETAILED DESCRIPTION

In the preferred embodiment the present invention is an electrodeposition process for producing a layered composite material comprised of layers of an alloy, wherein the layered composite material includes at least one layer of a first alloy species and at least one layer of a second alloy species.

The invention is intended for use with any alloy system in which the alloy is capable of being electrodeposited as different alloy species, the deposition of which is dependent upon the electroplating current, but is hereafter described with reference to the gold-tin alloy system as a preferred embodiment, in which $Au_5Sn$ is the first alloy species and AuSn is the second alloy species.

Figure 20:
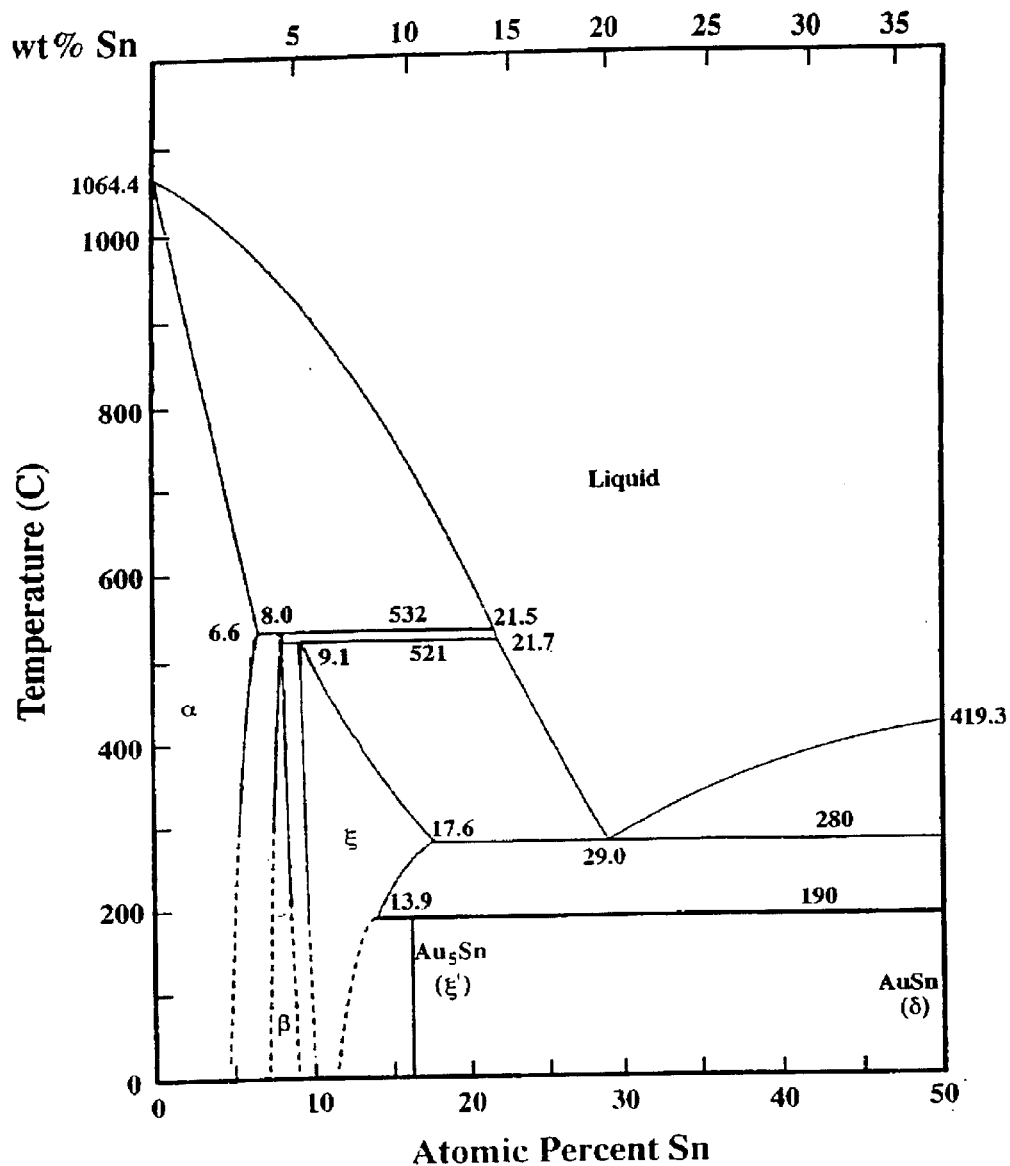
FIG. 20 is a phase diagram for the gold-tin alloy system showing the $Au_5Sn$ alloy phase, the AuSn alloy phase and the melting points for gold-tin alloys containing between 0 at % Sn and 50 at % Sn.

The invention may be practiced with alloy systems other than the gold-tin alloy system. The first step in practicing the invention with another alloy system is to select as an electroplating solution an electrolytic solution which includes a suitable solvent containing ions of the elements comprising the alloy or alloy system and which has been suitably stabilized for use as an electroplating solution so that it is capable of codepositing the elements of the alloy or alloy system as two or more alloy species. The second step in practicing the invention with other alloy systems is to select electroplating currents which will produce desired alloy species of the alloy system in order to form the layered composite material. The electroplating currents may be selected with reference to the phase characteristics of the alloy system, which phase characteristics may be represented as a phase diagram similar to the phase diagram for the gold-tin alloy system which is shown in FIG. 20.

One of the lead-free solders currently being used in optoelectronic and microelectronic packaging applications is the eutectic gold-tin alloy (approximately 30 at % Sn). In addition to the obvious environmental advantages of not containing lead, gold tin alloys also have excellent thermal and mechanical properties making gold-tin alloys a hard solder well suited for packaging applications in which long-term device reliability is important. In addition, the comparatively low melting temperature of 280° C. for the eutectic gold-tin alloy makes gold-tin alloys ideally suited for applications in which the materials are temperature sensitive.

Presently, most eutectic gold-tin alloys are prepared as solder preforms. The major drawback of this technique is that it requires expensive robots to place the preforms or it must be done manually, which is very labor intensive. Thin film deposition by evaporation or sputtering of the solder is an attractive alternative, since the oxide content is reduced relative to preforms and process control is better in terms of thickness uniformity and solder alignment. However, standard thin-film equipment is costly from a production viewpoint.

An alternate thin film deposition technique is electrodeposition. The benefits include reduced oxide formation, thickness uniformity, improved solder alignment (relative to performs) and significantly reduced capital costs, suggesting a strong commercial viability for this technique. Electrodeposition of an alloy solder can be either done sequentially of simultaneously. With sequential deposition, a pure tin layer is deposited on top of a pure gold layer. The disadvantage of this technique is that a post-deposition anneal is required to homogenize the composition through inter-diffusion. In addition to being a time consuming, multi-step process, such treatments often lead to segregation of the tin to the surface of the alloy layer resulting in the formation of an oxide layer that interferes with bonding.

One important advantage of direct alloy co-electrodeposition is that it is a one-step deposition procedure that requires no further heat treatment of diffusion during bonding.

An electroplating solution for use in co-electrodepositing gold-tin alloys and a method for co-electrodepositing gold-tin alloys has previously been developed and is described in U.S. Pat. No. 6,245,208 (Ivey et al). U.S. Pat. No. 6,245,208 (Ivey et al) is hereby incorporated by reference into this specification for its guidance in preparing electroplating solutions and for its guidance in electroplating methodology generally.

Expanding upon and refining the work which formed the basis of U.S. Pat. No. 6,245,208 (Ivey et al) it has now been shown that two distinct alloy phases, $Au_5Sn$ and $AuSn$, can be deposited separately over a range of current densities at compositions of 15 at % Sn and 50 at % Sn respectively. By adjusting the electroplating current, it is possible to deposit both alloy phases in a layered composite material thereby achieving any desired composition between 15 at % Sn and 50 at % Sn, including the commercially important eutectic composition. Notably, this further work based upon U.S. Pat. No. 6,245,208 (Ivey et al) has demonstrated a composition plateau of 50 at % Sn for gold-tin alloys at average current densities exceeding about 2 mA/cm$^2$, whereas in U.S. Pat. No. 6,245,208 (Ivey et al) a composition plateau of about 37–42 at % Sn was observed at similar average current densities.

As a result, in a preferred embodiment, the present invention is a method of depositing eutectic and near eutectic gold-tin alloys from a single electroplating solution as a layered composite material using the principles of alloy co-electrodeposition. In this way, deposition of the gold-tin alloy can occur directly on the wafer substrate without the need for any further homogenization treatments. The process may be tailored to produce any gold-tin alloy composition between about 15 at % tin and 50 at % tin without having to adjust the composition of the electroplating solution. By minimizing the thickness of the layers comprising the layered composite material, a completely interspersed structure can be approximated which will exhibit essentially the same physical properties as an equivalent alloy composition which does possess a true interspersed structure.

In the preferred embodiment pertaining to the gold-tin alloy system, a single electroplating solution is utilized for the deposition of any layered composite material in the gold-tin alloy system which has a composite material composition of between about 15 at % tin and 50 at % tin.

1. The Preferred Electroplating Solution

The electroplating solution of the preferred embodiment is composed of ammonium citrate ($H_2NO_2CCH_2C(OH)(CO_2NH_2)CH_2CO_2NH_2$), preferably triammonium citrate which functions as a buffering agent and in which a gold salt and a tin salt as well as stabilizing compounds for the gold and tin salts are dissolved. The gold and tin salts are preferably chlorides, most preferably potassium gold chloride $KAuCl_4$ and $SnCl_2$ respectively.

It is believed that other gold or tin salts may be suitable for use in the present invention; for example tin sulfate and $HAuCl_4$ are possibilities.

In the preferred embodiment a suitable stabilizer is used for the gold salt and another suitable stabilizer is used for the tin salt. It has been found that suitable stabilizers for the gold salts are $Na_2SO_3$ (sodium sulphite) and $Na_2S_2O_3$, although $Na_2SO_3$ is more effective at reducing gold precipitation during the addition of tin salt. Ethylene diamine has also been tried as a gold stabilizer, but in testing has been found to provide only marginal improvement in electroplating solution (i.e. bath) stability. When the preferred gold salt $KAuCl_4$ is used, the preferred gold stabilizer is sodium sulphite ($Na_2SO_3$).

A suitable stabilizer for the tin salt is ascorbic acid. When the preferred tin salt namely $SnCl_2$ is used, the preferred stabilizer is ascorbic acid, more specifically L-ascorbic acid ($HOCH_2CH(OH)(C(H)OC(O)C(OH)C(OH))$).

The $KAuCl_4$ and $SnCl_2.2H_2O$ salts are the sources of the initial Au (III) and Sn (II) ions, some of which immediately form the other possible valence states: Au (I) and Sn (TV). The tri-ammonium citrate functions as a buffer to maintain a nearly neutral solution pH. Sodium sulphite acts as a complexing agent for the gold, and to some degree for the tin. The following reactions are the most likely complexing reactions according to the specific stereochemistry of the Au (I), Au (III), Sn (II), and Sn (IV) ions [7]. The electroplating solution likely contains a mixture of all possible ions.

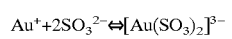
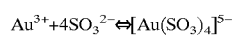
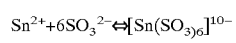
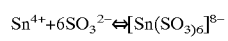
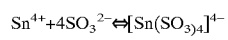

The L-ascorbic acid is used to prevent the hydrolysis of the tin in water. It acts as a chelating agent for the tin, thereby preventing its reaction with water. Although no specific reaction mechanism has been reported in the literature, the following reactions are suggested as possible complexing reactions between the tin and the L-ascorbic acid:

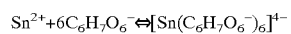
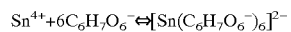

In the preferred embodiment of the invention the five principal constituents of the electroplating solution are preferably present in the ranges as set forth in Table A.

TABLE A

| | Broad range grams/Liter (g/L) of electroplating solution | Preferred range grams/Liter (g/L) of electroplating solution |
|---|---|---|
| ammonium citrate | 100 to 800 | 100 to 200 |
| gold salt | 5 to 20 | 5 to 10 |
| tin salt | 5 to 20 | 5 to 10 |
| gold stabilizer | 20 to 120 | 40 to 80 |
| tin stabilizer | 15 to 60 | 15 to 30 |

Optionally, nickel chloride ($NiCl_2$) may be added to the electroplating solution as a leveler, preferably in an amount of between about 0 and 2 g/L.

Eutectic or near eutectic gold-tin alloy compositions are attractive for microelectronic/optoelectronic applications because of their relatively low melting temperatures.

The eutectic composition for the gold-tin alloy system is approximately 70 at % Au and 30 at % Sn. This eutectic composition provides the lowest melting temperature for subsequent bonding applications. Near eutectic compositions, particularly hypereutectic (greater than 30% Sn) are also desirable, because gold-tin alloy solder may be used to bond gold coated wafers and chips which when combined with the solder lowers the overall tin content in the solder. Also, tin-rich solders do not increase the melting point as much as gold-rich solders (gold-rich relative to the eutectic composition). Generally the desired composite material composition will range from 25 to 40 at % Sn and more preferably from 27 to 35 at % Sn and most preferably for some applications at or very near to the eutectic composition.

For a given electroplating solution composition, the composite material composition can be controlled by controlling the electrodeposition conditions, including type of current (DC or PC), current ON time, current OFF time, average current density and peak current density.

In the examples that follow, a 1:1 ratio of Au salt to Sn salt was used in the electroplating solution.

A possible alternate electroplating solution for the gold-tin alloy system is the chloride system taught in the Matsumoto Japanese Patent JP 61 15,992. Preliminary experiments were carried out on the solution described in the patent, but the solution deteriorated immediately when Sn salt was added to the ammonium citrate buffered Au solution.

2. Preparation of the Preferred Electroplating Solution

The starting solution of the preferred compounds as above indicated was based on the Matsumoto Patent JP 61 15,992 and are listed below:

| | |
|---|---|
| 200 g/L | ammonium citrate ($H_4NO_2CCH_2C(OH)(CO_2NH_4)CH_2CO_2NH_4$) |
| 20 g/L | $KAuCl_4$ |
| 13 g/L | $SnCl_2.2H_2O$ |
| 30 g/L | L-ascorbic acid ($HOCH_2CH(OH)(C(H)OC(O)C(OH)C(OH)$) |
| 1 g/L | $NiCl_2$ |
| 5 g/L | peptone |

The electroplating solution was prepared according to the various techniques summarized in Table I.

any additives, the bivalent Sn chloride salt undergoes hydrolysis according to:

$$Sn^{2+} + 2H_2O = Sn(OH)_2 + 2H^+$$

with a solubility product for $Sn(OH)_2$ of $3 \times 10^{-27}$.

Solution A in Table I contained 30 g/L of L-ascorbic acid, while Solution B contained 200 g/L of ammonium citrate. Both solutions were acidic, which helps to minimize hydrolysis preventing hydroxide precipitation. After one week Solution A became turbid, while Solution B changed to dark yellow from colourless, but remained clear. The difference may imply that ammonium citrate is a complexing agent for $Sn^{2+}$ ions; however, no information was found in the literature concerning the complexing ability of ammonium citrate with bivalent Sn ions. Although the actual chemistry for the change in the solutions is not well understood, the change is attributed to the oxidation of stannous ions (II) by dissolved air to stannic ions (IV) and the formation of stannic compounds. Higher temperatures than room temperature result in increased oxidation rates. It can therefore be concluded that without any anti-oxidant additives, Solutions A and B are only stable for about a week. The behaviour of bivalent Sn ions in water is very complex. Possible forms of Sn ions in a chloride solution include $[SnCl]^+$, $[SnCl_2]$, $[SnCl_3]^-$ and $[SnOH]^+$ with stability constants of 14, 15, 50 and $10^{10}$, respectively.

$KAuCl_4$ is soluble in aqueous solutions and is light sensitive. It is used for toning silver photographic prints. Preparation of Solutions C and D (Table I) shows that $KAuCl_4$ undergoes hydrolysis both in light and in darkness. The solutions precipitate a fine black powder, which gradually changes to a gold color on standing. The powder was determined by EDX analysis to be metallic Au. In aqueous

TABLE I

Electroplating Solution Preparation.

| Solution # | Solution | Observations |
|---|---|---|
| A | 13 g/L $SnCl_2.2H_2O$ dissolved in 30 g/L L-ascorbic acid solution | Clear solution with pH = 1.7. Precipitation after 1 week |
| B | 13 g/L $SnCl_2.2H_2O$ dissolved in 200 g/L ammonium citrate solution | Clear solution with pH = 6.5. Solution still clear after 1 week but turned to dark yellow |
| C | 10 g/L $KAuCl_4$ dissolved in water | Solution turned black and turbid on standing. Precipitated fine black powder. |
| D | 10 g/L $KAuCl_4$ dissolved in water in darkness. | Solution turned black and turbid on standing. Precipitated find black powder. |
| E | 10 g/L $KAuCl_4$ dissolved in a 200 g/L ammonium citrate solution | Clear solution and stable in light. |
| F | Solution E added to B. | Solution turned black and turbid on standing. Precipitated fine black powder. |
| G | 10 g/L $KAuCl_4$ dissolved in a 800 g/L ammonium citrate solution and then Solution B added. | Same phenomena as Solution F. |
| H | 1. 10 g/L $KAuCl_4$ dissolved in a 800 g/L ammonium citrate solution<br>2. 13 g/L $SnCl_2.2H_2O$ dissolved in 400 g/L ammonium citrate solution<br>3. Solution (2) added to Solution (1) drop-by-drop with vigorous agitation | Clear solution with dark green colour. Precipitation after a few hours. |

Initial electroplating solution preparation results are shown in Table I. If Sn chloride is mixed with water, without solution, $AuCl_4^-$ ions are hydrolyzed to some extent forming $(AuCl_3)H_2O$. This in turn acts as a weak acid forming species such as $AuCl_{4-n}(OH)_n$ (where n varies from 0 to 4 and increases with increasing alkalinity) in alkaline solutions.

$$AuCl_4^- + H_2O = (AuCl_3)H_2O + Cl^- = AuCl_3(OH)^- + H^+ + Cl^-$$

The pH value of Solution E containing 200 g/L of ammonium citrate falls in the range of a weak acid. The hydrolysis of $KAuCl_4$ is prevented by the presence of concentrated ammonium citrate. $(NH_4)^+$ hydrolyzes in water, $$(NH_4)^+ = NH_3 + H^+$$

and produces a significant amount of $NH_3$ that dissolves in the solution. $NH_3$ can form complex $Au(NH_3)^{3+}$ cations with simple Au(III) ions (if any are present) in the solution. The stability of Au(III) ions in the solution is further improved. The stability constant for $AuCl_4^-$ is $10^{26}$; however, no stability constant data for $Au(NH_3)^{3+}$ is available in the literature.

Preparation of Solution F (Table I) was the first attempt to make a Au—Sn solution. It turned black and turbid immediately after the Au solution (E) was added to the Sn solution (B). The exact chemistry responsible for the instantaneous precipitation of fine black powder is not clear because of the lack of relevant information. Still, it is reasonable to surmise that a chemical interaction between Au ions and Sn ions causes the problem. The chemical processes for Au precipitation when Sn salt and Au salt are mixed can be $AuCl_4^-$ ion reduction to $AuCl_2^-$ ions, followed by $AuCl_2^-$ ion dissociation.

$$3AuCl_2^- = AuCl_4^- + 2Au + 2Cl^-$$

Since ammonium citrate is able to complex Au ions, solutions with more concentrated ammonium citrate should be more stable. Preparation of Solutions G and H is the result of such an attempt. No improvement was found for Solution G, while Solution H was the first solution that remained clear after preparation. Solution H was prepared by adding the Au solution drop-by-drop instead of by pouring the entire Au solution in the Sn solution. This implies that a high concentration of ammonium citrate is needed to eliminate the chemical reaction between Au(III) ions and Sn(II) ions. The way that ammonium citrate works may be twofold, i.e., as either a Au complexing agent or a Sn complexing agent. Since a very high concentration of ammonium citrate is needed to stabilize Au or Sn ions, it can be surmised that it is not a strong complexing agent for either Au(III) or Sn(II) ions. Solution H has two major problems in terms of being used as a practical plating solution. One problem is its short lifetime; the solution deteriorated by precipitating only a few hours after preparation. The other problem is the high viscosity of the solution, due to the high concentration of ammonium citrate. High viscosity results in a slow mass transport rate and therefore a lower limiting current density. Although the improvement in Solution H relative to the other solutions was minor, the key to developing a stable Au—Sn solution seems to lie in finding a more efficient Au complexing agent to decrease the oxidizing ability of Au ions when mixed with the reducing agent, bivalent Sn.

It will be apparent that to obtain a stable solution may require the use of a specific mixing sequence, as without it the results may not be acceptable. As shown in Table 1, the procedure defined in H was the only one that succeeded and it required that the gold salt be dissolved in the ammonium citrate and then a solution of the tin salt in ammonium citrate be added drop (volume less than about 5 mL) after drop to the gold salt solution while under continuous vigorous agitation. Although the specific mixing sequence is believed to be important, further testing has suggested that the gold solution and the tin solution may be combined and mixed in bulk (i.e., not drop by drop) with satisfactory results.

While procedure H showed the most promise, it still did not provide the stability required for most commercial operations.

To compensate for this deficiency in stability, three candidate stabilizers were reviewed namely, $Na_2SO_3$ (20–100 g/L), $Na_2S_2O_3$ (20–100 g/L) and $Na_2H_2EDTA \cdot 2H_2O$ (5–40 g/L). The stabilizers were added separately to a solution of 300 g/L of ammonium citrate and 10 g/L of $KAuCl_4$. The solution preparation procedure was to add chemicals in the following sequence: ammonium citrate, Au salt, stabilizer and then the Sn chloride salt (5 g/L). Each solution was stirred thoroughly after each step to ensure complete dissolution.

$Na_2SO_3$ was more effective than $Na_2S_2O_3$ at reducing Au precipitation during the addition of Sn salt. The $Na_2SO_3$ containing solution was clear and stable for several days, while Au precipitation occurred within a few minutes for the $Na_2S_2O_3$ containing solution. $Na_2H_2EDTA$ is a complexing agent for many base metal impurities in plating baths. However, it fails to prevent interaction between Au and Sn ions; Au precipitates on the wall of the beaker within a few minutes of mixing the Au and Sn solutions.

In the method of preparing Au—Sn sulphite solutions of the present invention, Au is added in the form of solid $KAuCl_4$ salt that is dissolved in a concentrated ammonium citrate solution. When $Na_2SO_3$ is added to the solution, no precipitation occurs. It is presumed that the Au(III) ions have been reduced to Au(I) ions. The stability of the Au—Sn solution was substantially improved; no Au precipitation occurred when Sn salt was added.

Based on the screening tests, $Na_2SO_3$ (sodium sulphite) was selected as a Au stabilizer for additional tests. L-ascorbic acid was chosen as the Sn stabilizer to prevent Sn hydrolysis.

Experiments were carried out according to Table II to test solution lifetime for different concentrations of additives.

TABLE II

Solutions Utilized for Bath Stability Tests.

|  | S1 | S2 | S3 | S4 | S5 | S6 | S7 | S8 | S9 | S10 |
|---|---|---|---|---|---|---|---|---|---|---|
| Ammonium citrate (g/L) | 200 | 200 | 200 | 200 | 100 | 200 | 200 | 200 | 200 | 200 |
| $KAuCl_4$ (g/L) | 5 | 5 | 5 | 5 | 7 | 7 | 7 | 10 | 14 |  |
| $Na_2SO_3$ (g/L) |  |  | 60 | 60 | 60 | 60 | 30 | 60 | 60 |  |

TABLE II-continued

Solutions Utilized for Bath Stability Tests.

|  | S1 | S2 | S3 | S4 | S5 | S6 | S7 | S8 | S9 | S10 |
|---|---|---|---|---|---|---|---|---|---|---|
| L-ascorbic Acid (g/L) |  | 15 |  | 15 | 15 | 15 | 15 | 15 |  | 30 |
| $SnCl_2.2H_2O$ (g/L) | 5 |  | 5 | 5 | 7 | 7 | 7 | 10 |  | 14 |
| Solution Stability (days) | 0 | 0 | 4 | 15 | 11 | 9 | 3 | 7 | 8 | 7 |

Solutions S1 and S2, which contained no sodium sulphite, deteriorated immediately when Sn salt was added. With 60 g/L of $Na_2SO_3$, Solution S3 remained clear and stable for four days; after which it began to gradually precipitate fine Au particles. Solution S4 was the same as S3, except for the addition of 15 g/L of L-ascorbic acid. The solution stability was improved to fifteen days. Its stabilizing effect is quite surprising since L-ascorbic acid was originally added to prevent Sn hydrolysis. L-ascorbic acid only changed the pH from 6.5 to 6.0, since a high concentration of ammonium citrate, a buffering agent, was also present in the solution.

Comparison of Solutions S5 and S6 seems to indicate that the concentration of ammonium citrate has very little influence on bath stability, which may be because most of the Au ions are present in the form of a Au sulphite complex. A lower citrate concentration is favoured for practical plating, since the viscosity is lower.

Comparison of Solutions S4, S6 and S8, which contained gradually increased amounts of Au and Sn salts, shows that the higher the total salt content, the shorter the bath lifetime. Because the chemical reaction rate is proportional to the reactant concentrations, the higher the total concentration of reactants (Au and Sn ions), the faster the Au precipitates from solution.

The effect of sulphite on bath stability is clearly evident by comparing Solutions S6 and S7. S7 contained less sulphite and its lifetime was shortened from nine days to three days. Since the stability constant for Au sulphite is fairly low, free sulphite is required.

Another possible alternative to improve bath stability is to prepare and store the Au and Sn solutions separately and mix them when plating is to be performed. Solution S9 is a Au solution and S10 is a Sn solution. If S9 and S10 are mixed at a 1:1 volume ratio, the overall make-up would be the same as S7. The Au solution has a lifetime of seven-eight days, after which Au precipitation begins. The Sn solution turns light yellow from colourless after seven days, but remains clear for more than thirty days. The reason that Au still precipitates from solutions containing sulphite is that the stability constant for the sulphite complex is not that large and, with time, any free sulphite is oxidized by air at the liquid/air interface. It would be expected that for solutions used for plating, the lifetime would be even shorter because of sulphite consumption by anodic and chemical oxidation and cathodic reduction. The change in colour of the Sn solution is due to oxidation of bivalent Sn to tetravalent Sn.

It is apparent that solutions S4 and S5 containing 70% ammonium citrate; 2% $KAuCl_4$; 21% $Na_2SO_3$; 5% L-ascorbic acid; and 2% $SnCl_2.2H_2O$ and containing 53% Ammonium citrate; 3.5% $KAuCl_4$; 32% $Na_2SO_3$; 8% L-ascorbic acid; and 3.5% $SnCl_2.2H_2O$ respectively were the most effective.

3. Previous Electrodeposition Testing of the Preferred Electroplating Solution

Testing of the preferred electroplating solution was carried out in connection with the work which resulted in U.S. Pat. No. 6,245,208 (Ivey et al) and a discussion of the results of this testing is reproduced in the description that follows in this Section 3.

Figure 1:
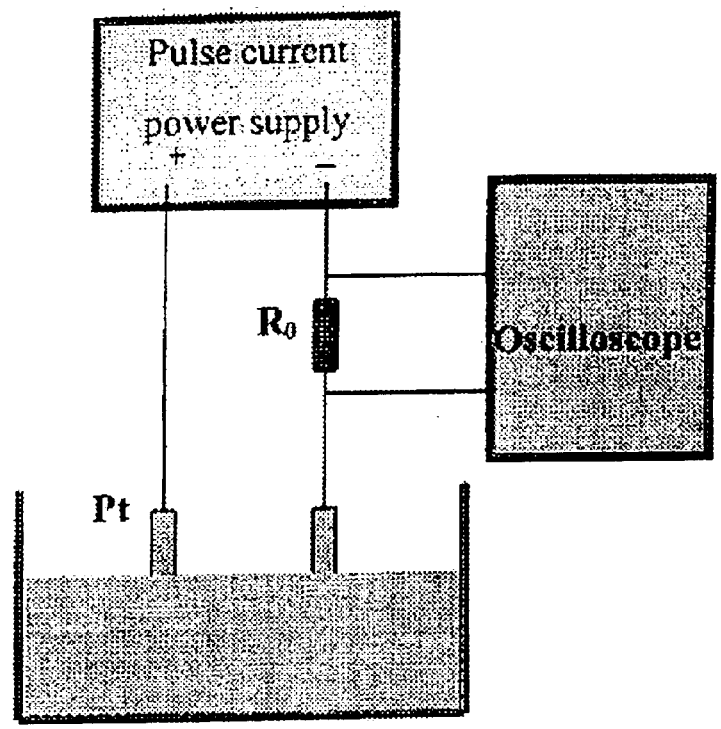
FIG. 1 is a schematic illustration of an electroplating arrangement suitable for use in the invention.

A schematic of an electrodeposition setup used to test the effectiveness of the preferred electroplating solution is shown in FIG. 1. A pulsed current capable power supply, with ON and OFF time settings in the 0–9.9 ms range, was utilized. A 50Ω standard resistance $R_0$ was connected in series with the electroplating bath to monitor the peak current density in the circuit through an oscilloscope.

The cathodes were either InP or Si wafers, coated with Ti (25 nm)/Au (250 nm) blanket metallizations. Wafers were sectioned into smaller pieces, each having an exposed area of 1 cm×1 cm defined by stop-off lacquer. Platinum foil was used as the anode. The cathode-anode spacing was maintained at a fixed value throughout the electrodeposition process.

Plating experiments were carried out at a fixed temperature (20° C.) under both direct current (DC) and pulsed current (PC) conditions. For PC plating, ON and OFF times were varied and their effects correlated with deposit composition and microstructure. One set of experiments was done at constant average current density (2.4 mA/cm$^2$), cycle period (10 ms) and plating time (1 hr.), while varying the ON time from 0.2–5 ms. A second set of experiments was done while maintaining a constant peak current density (10 mA/cm$^2$), OFF time (8 ms) and plating time (80 min), and varying the ON time from 0.5–4 ms. Finally, plating experiments were done at OFF times ranging from 3–9.9 ms. The peak current density was maintained at 10 mA/cm$^2$, with an ON time and plating time of 2 ms and 80 min respectively.

The electroplating solution of the invention that was used for these electroplating tests was solution S4 (Table II) with a small amount (1 to 2 g/L) of leveller (1 g/L NiCl$_2$) added.

All electrodeposited samples were examined in a scanning electron microscope (SEM), equipped with an energy dispersive x-ray (EDX) spectroscopy system. An accelerating voltage of 20 kV was used for both imaging and composition analysis; pure Au and pure Sn standards were used for quantitative analysis. Both plan view and cross section samples were examined. Cross sections were either prepared by cleaving, for imaging and thickness measurements, or by polishing, for quantitative composition analysis. Deposit surface roughness was measured by atomic force microscopy.

Reproducibility tests were carried out to assess the repeatability of the plating bath. A single metallized InP wafer piece (1.5 cm$^2$ exposed area) was plated continuously from a 50 ml plating solution. An average current density of 1.6 mA/cm² was used, with an ON time of 2 ms and an OFF time of 8 ms, for a total of 40 hrs. Deposit composition was determined from polished cross sections at 2.25 µm intervals from the deposit-wafer interface.

(a) Direct Current (DC) vs. Pulsed Current (PC)

Figure 2:
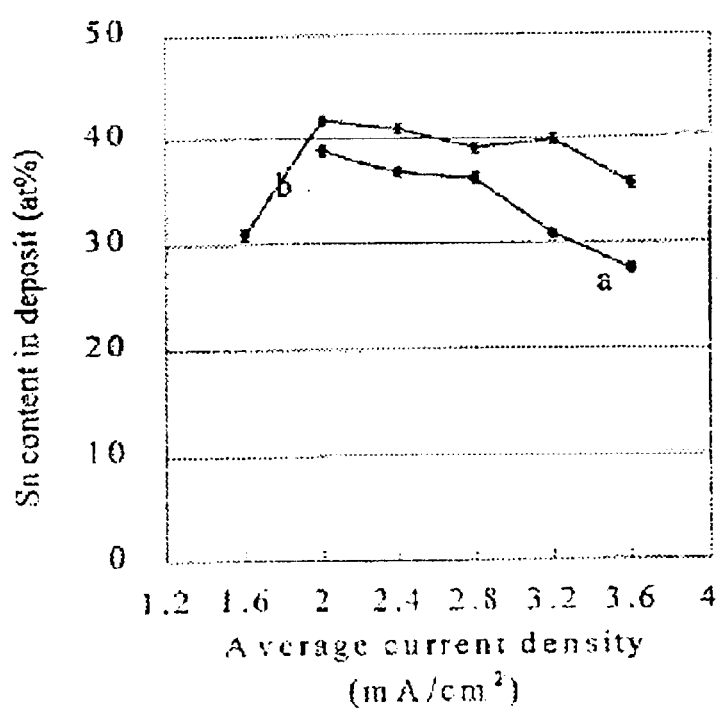
FIG. 2 is a plot of Sn concentrations in gold-tin alloy deposits when obtained at different average current densities under direct current (DC) and pulsed current (PC) conditions.

Deposit composition results for direct current (DC) and pulsed current (PC) (with ON time of 2 ms and OFF time of 8 ms) plated samples are shown in FIG. 2. The composition vs. current density relationships are similar for DC and PC plating. The tin content initially increases with increasing average current density, reaches a plateau and then decreases with increasing current density. Increasing the current density tends to favor plating of the less noble metal (Sn in this case). If the current density is too high, however, hydrogen evolution becomes significant, decreasing the efficiency of alloy plating. Hydrogen evolution may also cause a local increase in pH, increasing the susceptibility of Sn ion complexing. Tin ions will be further stabilized as a result of complex formation, suppressing Sn plating and reducing tin concentration in the deposit.

From FIG. 2, it is clear that DC deposits obtained at the same current densities are consistently lower in Sn content than PC deposits. This result is similar to that found in other Au alloy pulse plating systems, e.g., Au—Co and Au—Ni systems, and may be due to a difference in polarization behavior for PC and DC modes. The cathodic potential in PC mode may be more negative relative to DC mode, which would favor Sn plating.

Figure 3:
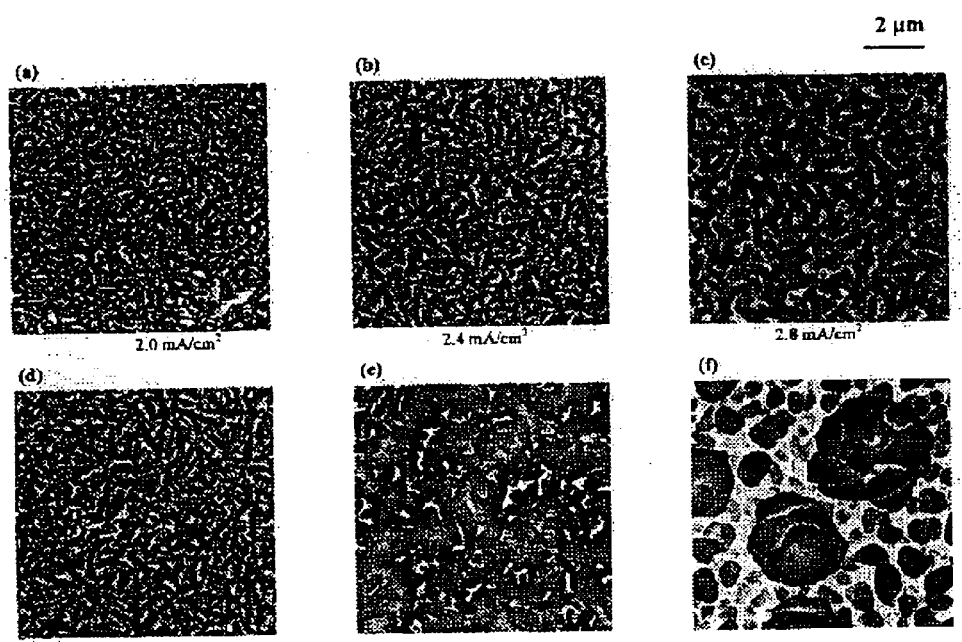
FIG. 3 is a copy of scanning electron microscope (SEM) top view images of a plurality of PC and DC plated deposits of gold-tin alloys.

Representative microstructures for the deposition conditions presented in FIG. 2 are shown in FIG. 3. DC and PC deposits are similar for current densities in the 1.6–2.0 mA/cm² range, i.e., at low average current densities PC plating has no obvious influence on deposit microstructure. Both DC and PC deposits show a tendency towards coarser microstructures at higher current densities, with the effect more pronounced for DC deposits. At a given average current density, the peak current density is considerably higher for PC plating, i.e., about 5 times that for DC plating (based on a duty cycle of 20%). The higher peak current density results in higher overpotentials and a finer deposit structure, because the rate of electron transfer in PC deposits to form adatoms is much faster than the diffusion rate of the adatoms across the surface to positions in the lattice, which favours nucleation. If the current density is too high, the limiting value is exceeded, i.e., metal ions are consumed faster than they can arrive at the cathode and the plating is under diffusion control, resulting in dendritic growth and a rough deposit surface.

Figure 4:
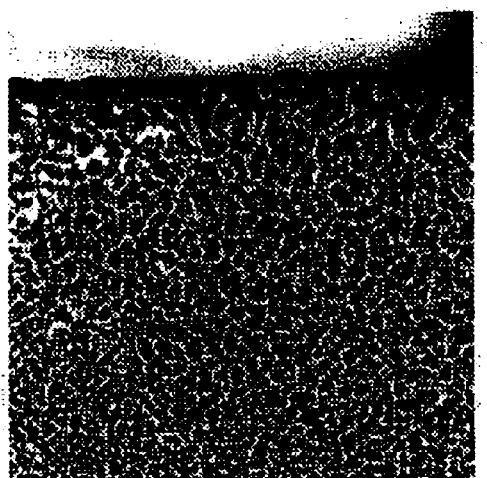
FIG. 4 is a copy of enlarged SEM top view images showing edge effects on gold-tin alloy deposits obtained at different average current densities.
Figure 4:
Figure 4:

Sample edge effects in PC plating at average current densities of 2.0, 2.8 and 3.2 mA/cm² are shown in FIG. 4. Edge effects are clearly more pronounced at higher current densities. The actual current density at the edge is higher than the current density setting. As the average current density is increased, the actual current density approaches the limiting current density and the deposits are more likely to exhibit microstructures characteristic of limiting current conditions, i.e., coarse grains and even dendritic growth.

(b) Effect of Pulsed Current ON Time

Figure 5:
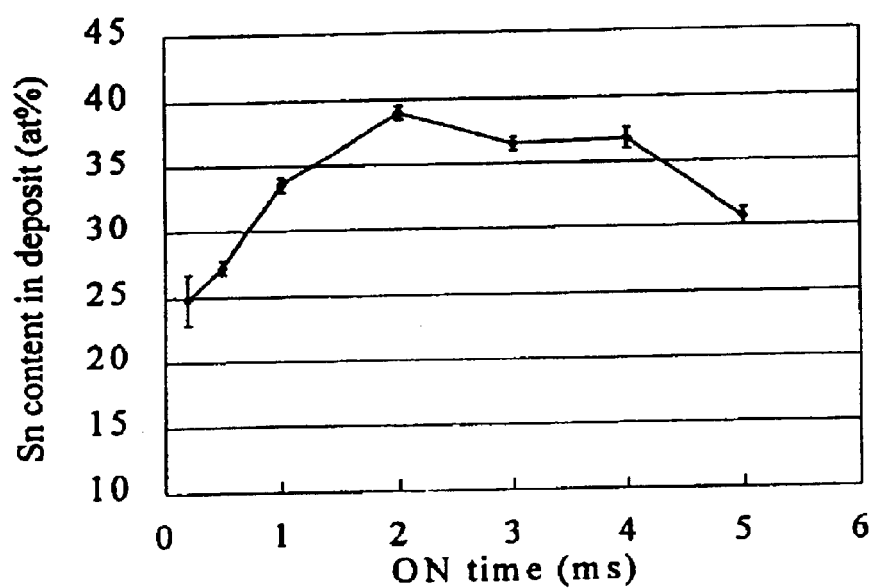
FIG. 5 is a plot showing the effect of ON time in PC plating on gold-tin alloy composition, for a fixed average current density and cycle period.
Figure 6:
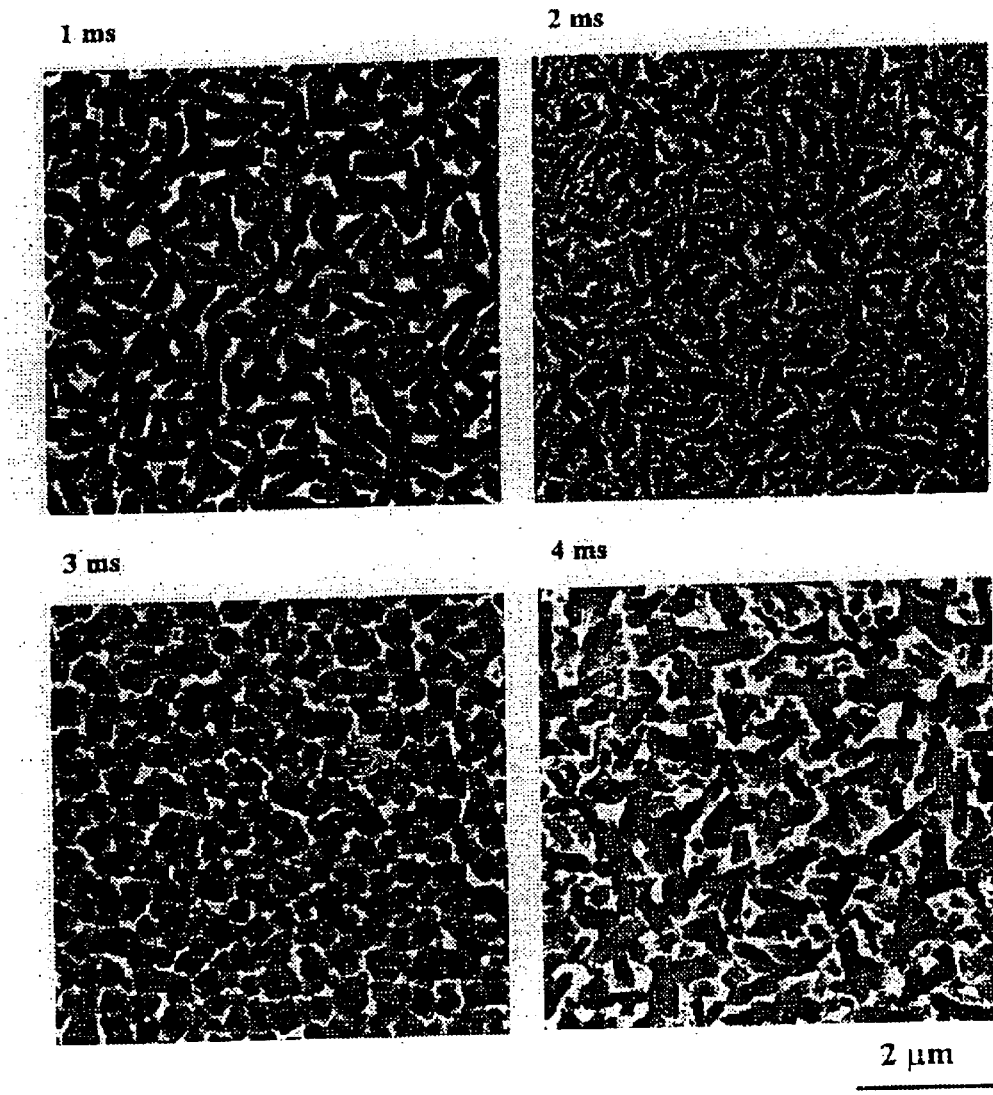
FIG. 6 is a copy of SEM top view images of a plurality of gold-tin alloy deposits resulting from PC plating at various ON times, corresponding to the ON times depicted in FIG. 5.

Deposit composition results obtained at different ON times, for a fixed average current density (2.4 mA/cm²) and cycle period (10 ms), are plotted in FIG. 5. Corresponding microstructures are shown in FIG. 6. The deposit composition plot initially increases with increasing ON time, forms a plateau in the 1–4 ms range and then decreases at values greater than 4 ms. The wide plateau has obvious advantages for practical electroplating operations. An increase in ON time corresponds to a decrease in the peak current density (since the average current density is fixed) and a decrease in the OFF time. If the ON time is too short, e.g., 0.2 to 0.5 ms, charging or capacitance effects are evident. The faradaic current for alloy plating is substantially lower than the peak current setting, which may explain the lower Sn content. At relatively long ON times, e.g., 5 ms, the peak current density is quite low, which favours Au plating and therefore results in a lower Sn content. For example, at an ON of 5 ms, the peak current density is 4.8 A/cm² which is 20% of the peak current density for an ON time of 1 ms.

For pure metal pulse plating, the ON time should be shorter than the transition time, otherwise hydrogen evolution or organic decomposition may occur. Hydrogen evolution decreases the current efficiency while organic decomposition causing carbon plating destroys the deposit by increasing the deposit resistance. For alloy pulse plating, the mechanism is somewhat more complicated than that for pure metal pulse plating; it is possible that each component has a transition time.

It is clear from the SEM micrographs in FIG. 6 that deposits obtained at 2 ms of ON time have the densest structures, finest grain size and smoothest deposits. This is confirmed by AFM surface roughness measurements. Deposit surface mean roughness values for 1, 2, 3 and 4 ms ON times are 73.8, 58.4, 64.1 and 62.9 nm, respectively.

Figure 7:
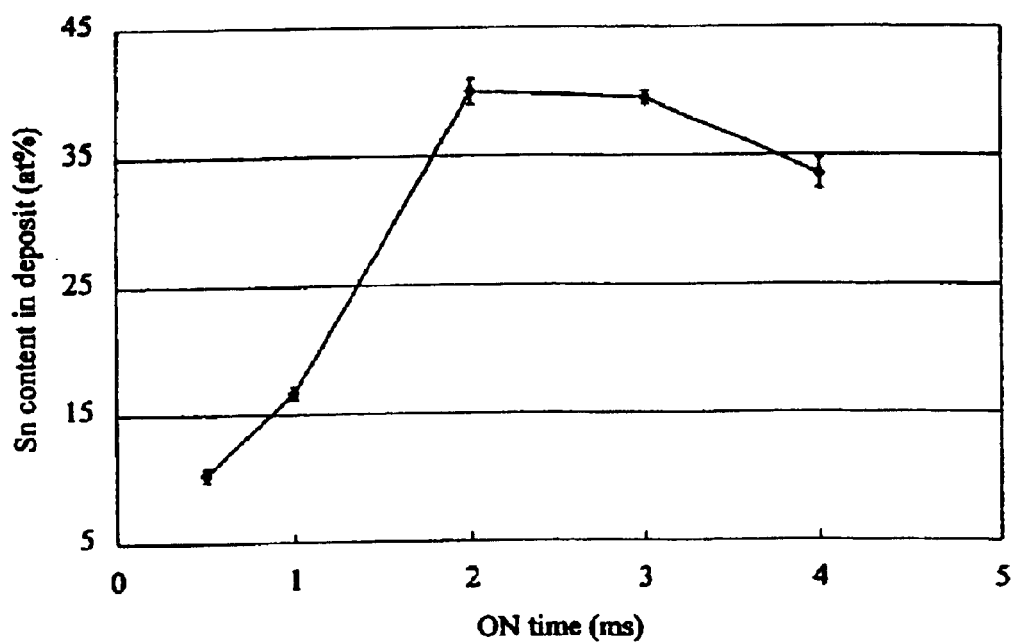
FIG. 7 is a plot showing the effect of ON time on gold-tin alloy composition at a constant peak current density.

Deposit composition results obtained at different ON times, for a constant peak current density (10 mA/cm²) and OFF time (8 ms), are plotted in FIG. 7. The Sn content increases with increasing ON time for short ON times, reaches a plateau and then decreases with further increases in ON time. The rising portion of the curve may be related to the transition time for Au plating. For ON times longer than 0.5 ms, Au plating becomes diffusion controlled and Sn plating or hydrogen evolution begins. As such, the Au transition time is =0.5 ms. When the ON time is increased to 2 ms, both Au and Sn plating are likely diffusion controlled, giving rise to the plateau in the composition plot. Further increases in ON time lead to additional hydrogen evolution, which may result in an increase in the local pH value and suppress Sn plating.

Figure 8:
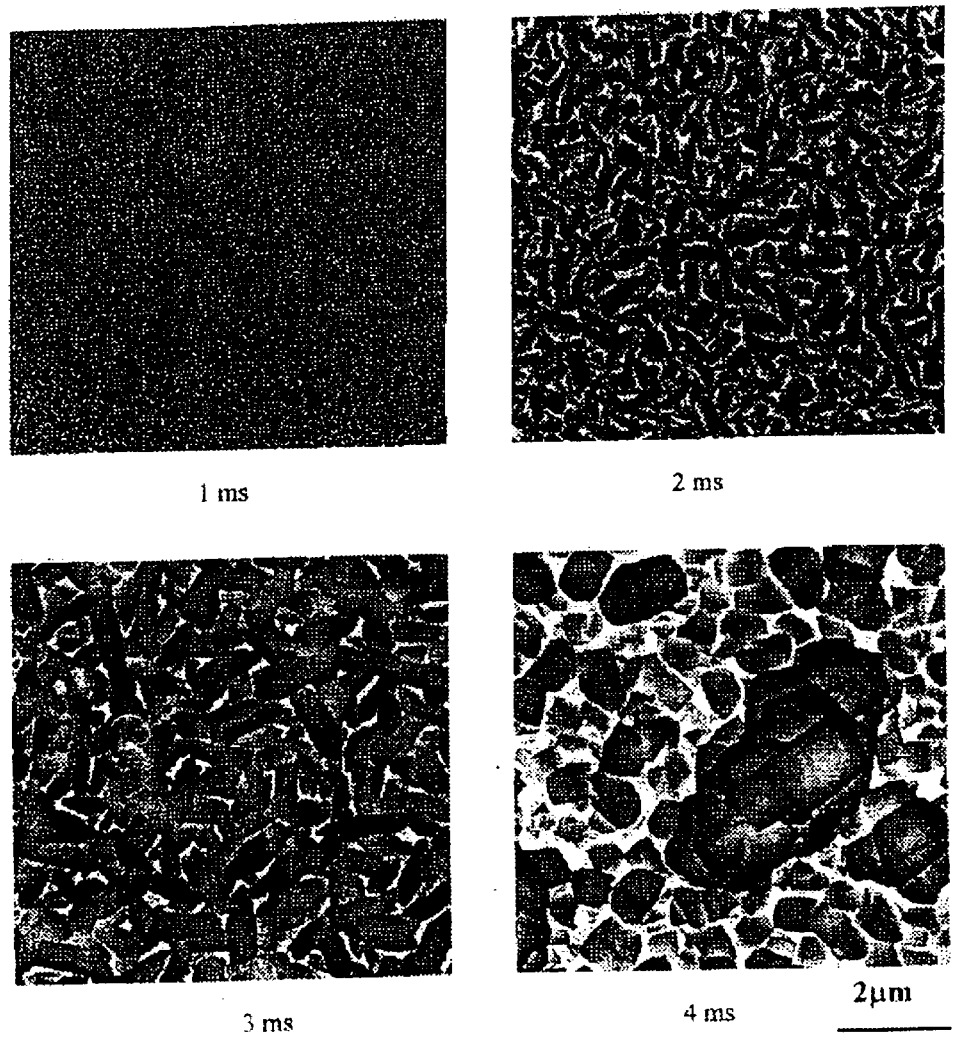
FIG. 8 is a copy of SEM top view images of a plurality of different PC gold-tin alloy deposits resulting from different ON times at constant peak current density, corresponding to the ON times depicted in FIG. 7.

SEM micrographs of deposits obtained at different ON times are shown in FIG. 8. The 1 ms ON time sample has a much finer microstructure than the other deposits. This may be due in part to its high Au content or low Sn content (16.7 at %) relative to the others, which have Sn levels greater than 33 at %. For the higher Sn content deposits, roughness appears to increase with increasing ON time. At longer ON times, the average current density increases leading to thicker and coarser deposits. At 4 ms of ON time, the microstructure approaches that obtained from DC plating.

Figure 9:
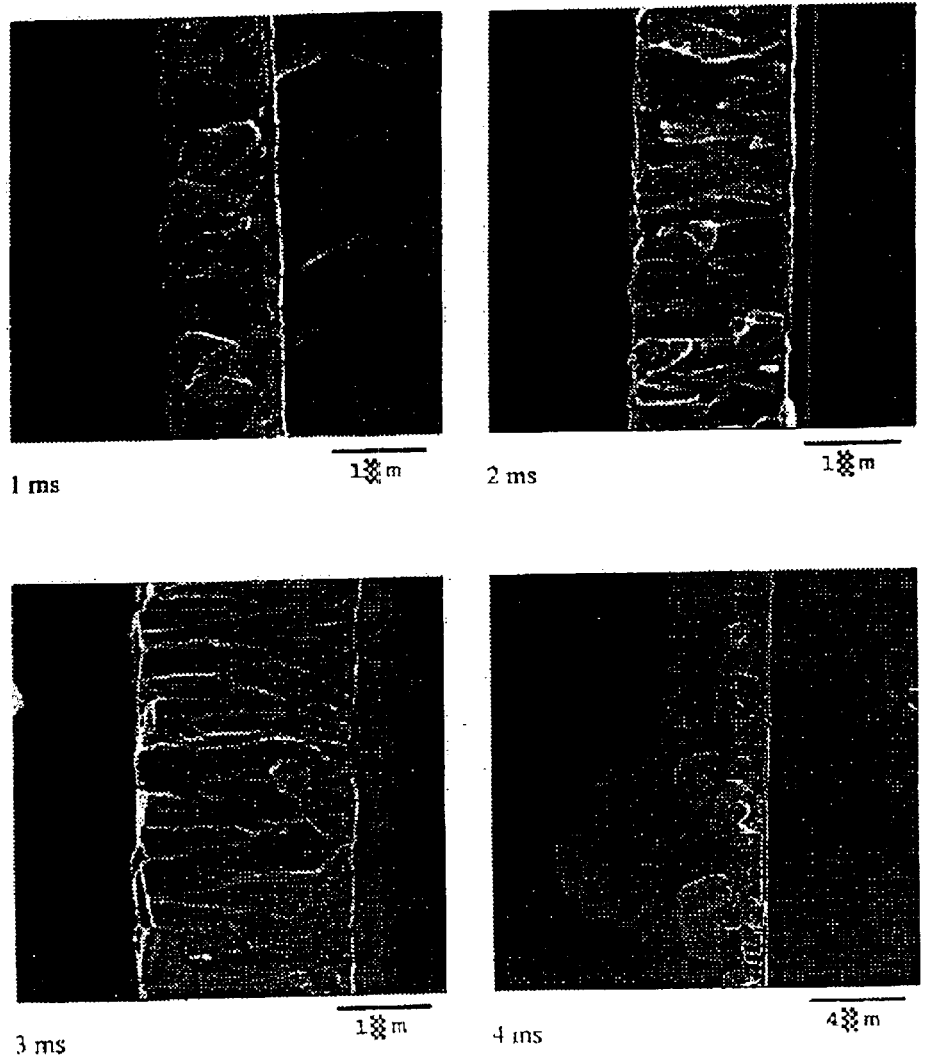
FIG. 9 is a series of cleaved cross section images of gold-tin alloy deposits resulting from different ON times and constant peak current density, corresponding to the ON times depicted in FIG. 7.

Cleaved cross sections of the deposits in FIG. 8 are shown in FIG. 9. The 1 ms ON time sample exhibits ductile fracture, which is due to its high Au content. Deposits obtained at 2 and 3 ms of ON time are dense and uniform and adhere well to the substrate. The microstructures are very similar to typical solidified cast structures, with the initial deposit fine grained and subsequent grains growing in a columnar manner. The fractured surfaces of these two deposits are more characteristic of brittle fracture, due to the increased amount of AuSn; both deposits are hypereutectic in composition, i.e., 39 at % Sn compared to the eutectic value of 30 at % Sn. The 4 ms ON time sample is very rough—its thickness varies from 1.4 to 8.9 µm —which is due to the high average current density (3.3 mA/cm²), which is likely close to the limiting current density.

Practically speaking, ON times of 1–3 ms produce suitable microstructures and reasonable plating rates (0.7–1.7

μm/hr). Higher plating rates could be achieved by increasing the Au and Sn contents in the plating bath, which has the effect of increasing the limiting current density.

(c) Effect of Pulsed Current OFF Time

Figure 10:
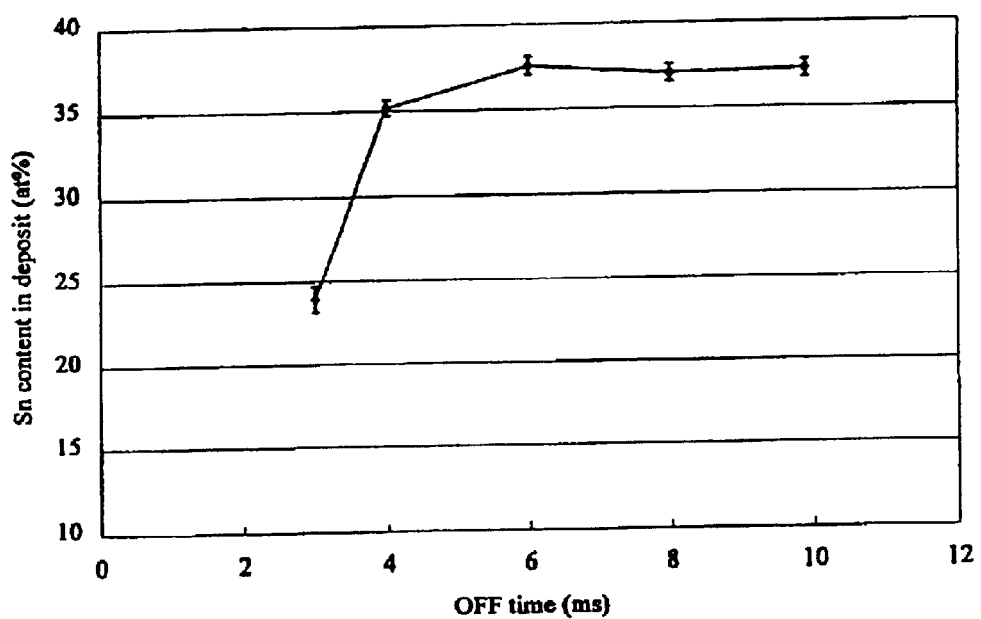
FIG. 10 is a plot of gold-tin alloy deposit composition at different OFF times and constant peak current density.

The effect of OFF time on deposit concentration is shown in FIG. 10. In all cases, the peak current density was 10 mA/cm$^2$, the ON time was 2 ms and the plating time was 80 min. The Sn content initially increases for OFF times in the 3–4 ms range; further increases in OFF time lead to a constant Sn content. During the ON portion of the plating cycle, the cathode region becomes depleted of Sn ions. During the OFF time, the Sn ion concentration is recovered to some extent, before the next pulse, by the diffusion of Sn ions from the bulk solution to the depletion region. The extent of recovery depends on the length of OFF time. If the OFF time is long enough (4 ms here), the Sn ion concentration at the cathode reaches the bulk value before the next pulse. Any further increase in OFF time appears to have no influence on deposit concentration.

Figure 11:
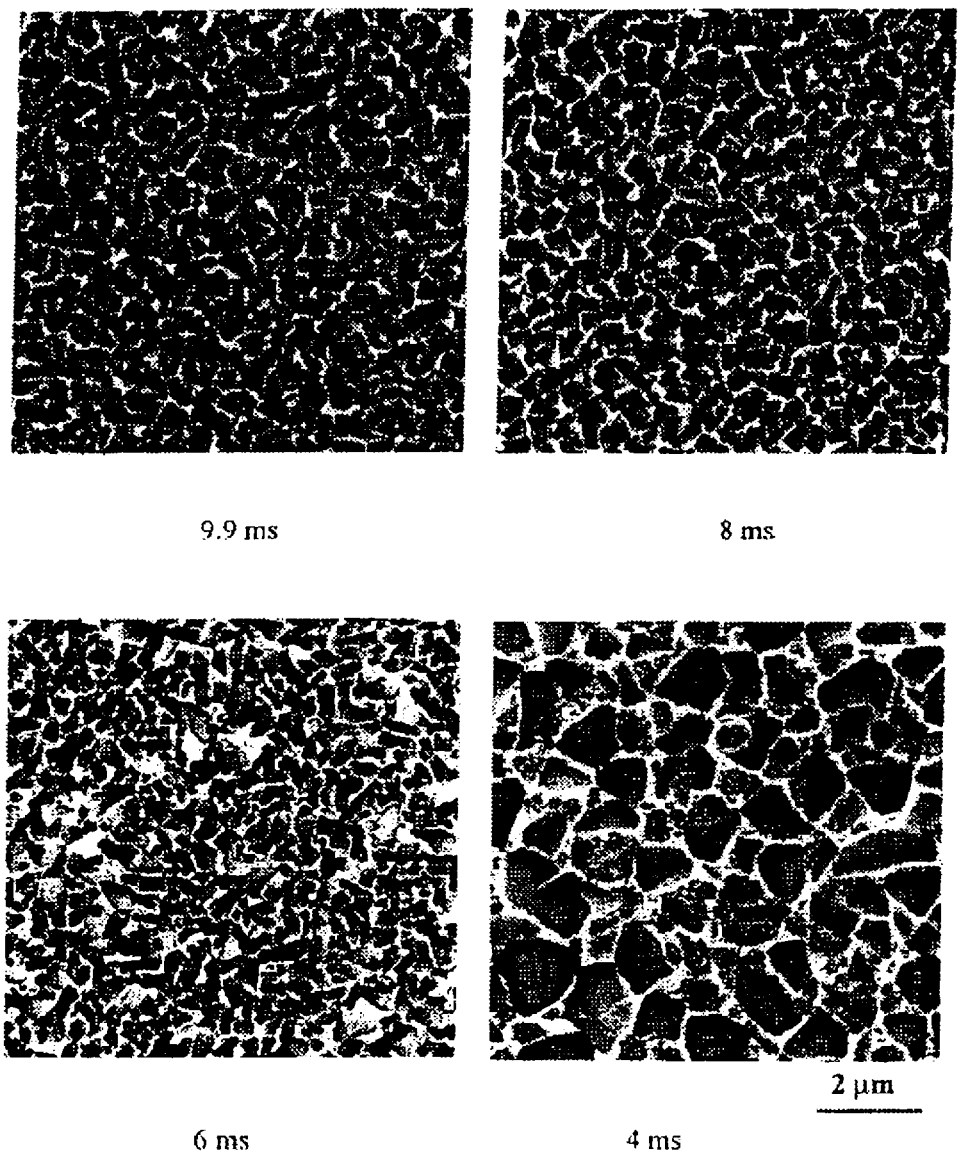
FIG. 11 is a copy of SEM top view images of gold-tin alloy deposits obtained with different OFF times, corresponding to the OFF times depicted in FIG. 10.

SEM images corresponding to the deposits plotted in FIG. 10 are shown in FIG. 11. The 3 ms OFF time sample is not shown, but was quite porous and black in colour, which indicates a high carbon content in the deposit. The OFF time was too short to allow the Au and Sn concentrations at the cathode to return to the bulk values, resulting in a diffusion controlled plating condition. For deposits with OFF times=4 ms, the microstructure becomes finer with increasing OFF time, while the composition remains almost constant. The longest OFF times (8 and 9.9 ms) give similar microstructures, which indicates that the recovery time is sufficient.

OFF time has been reported to effect deposit microstructure in different ways. An increase in OFF time reportedly results in grain refinement for Cd deposition, but in grain growth for Cu and Au. It has been argued that for Cu and Au, grain growth, which is thermodynamically driven, occurs during the OFF cycle. For Cd, grain growth is believed to be retarded by adsorption of inhibiting species during the OFF cycle.

Figure 12:
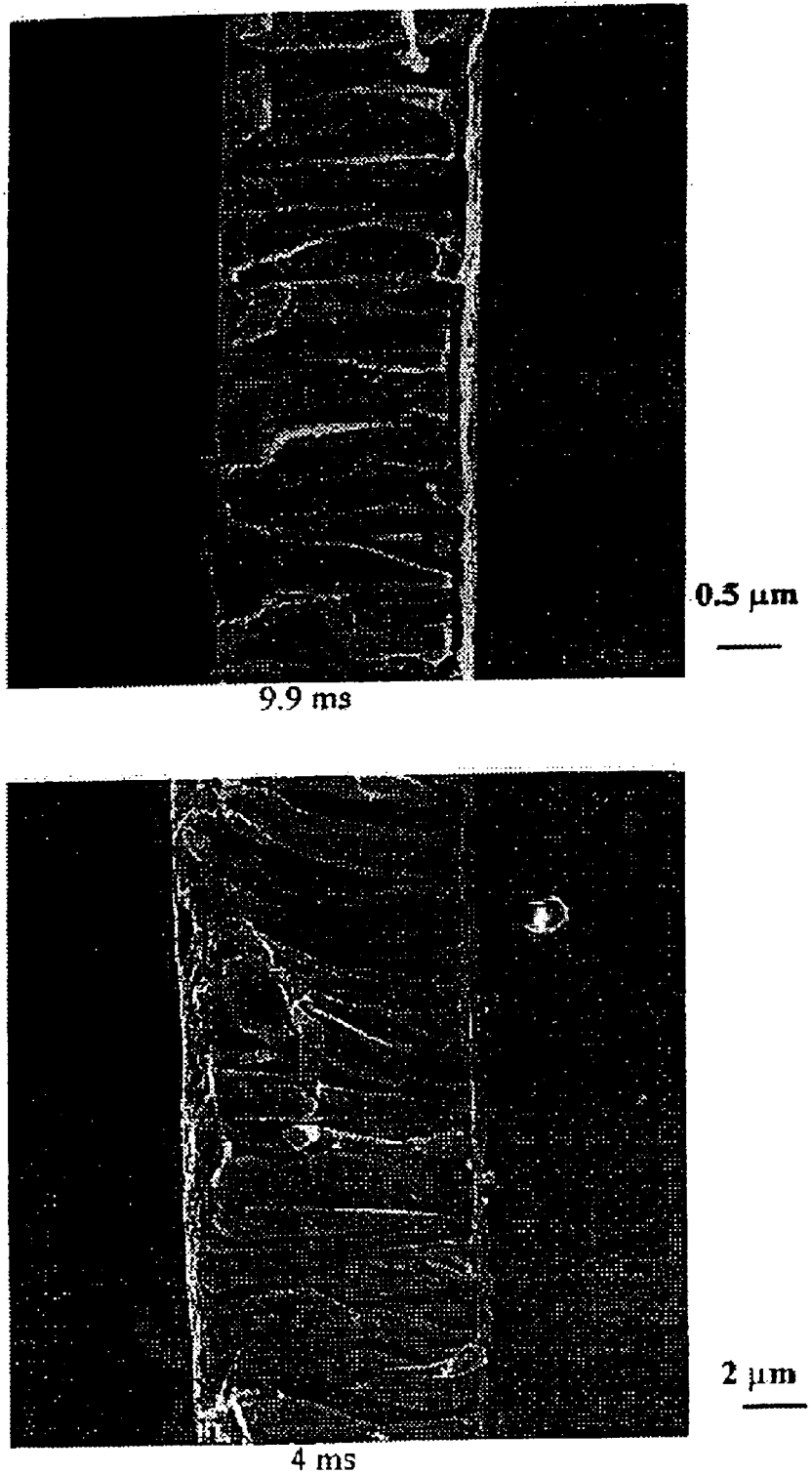
FIG. 12 is a copy of SEM cross section images for gold-tin alloy deposits obtained at selected OFF times, corresponding to the OFF times depicted in FIG. 10.

Cleaved cross section images of samples obtained at OFF times of 9.9 ms and 4 ms are shown in FIG. 12. The thicknesses of the two deposits are 1.6 and 7.6 μm respectively. The average current density for the 4 ms OFF time sample is twice that of the 9.9 ms OFF time sample; however, the deposit thickness at 4 ms of OFF time is more than four times that of the 9.9 ms OFF time sample. Both samples exhibit a columnar structure, with the 9.9 ms OFF time sample being more dense.

(d) Reproducibility Testing

Figure 13:
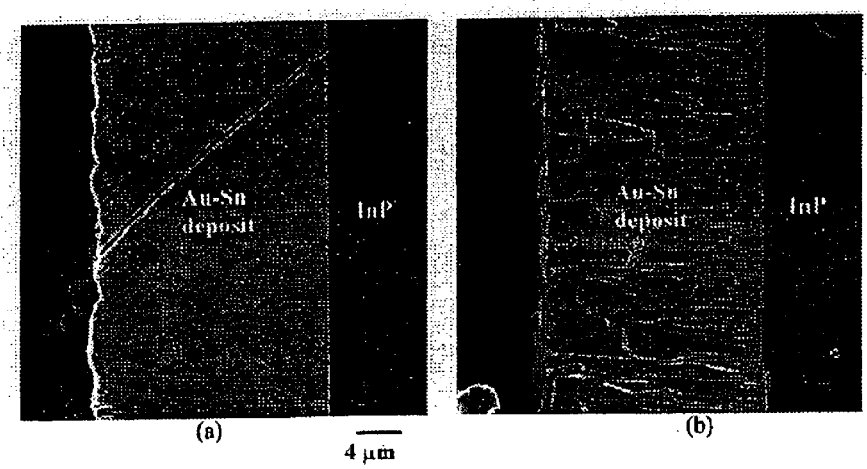
FIG. 13 is a copy of SEM images of a polished and cleaved gold-tin alloy deposit obtained in a reproducibility test.

A single metallized InP wafer piece (1.46 cm$^2$ exposed area) was plated continuously from a 50 ml plating solution to a final thickness of 26 μm. Surface composition analysis of the resultant deposit at five different locations yielded an average composition of 10.8±0.6 at % Sn. The surface morphology was fairly coarse. SEM images of polished and cleaved cross sections are shown in FIG. 13. The deposits are columnar with a finer grain structure near the metallization layer. The fracture mode of the cleaved sections is primarily brittle in nature, but becomes more ductile near the deposit surface. This is an indication that the composition is more Sn-rich in the interior of the deposit and Sn-deficient near the surface.

Figure 14:
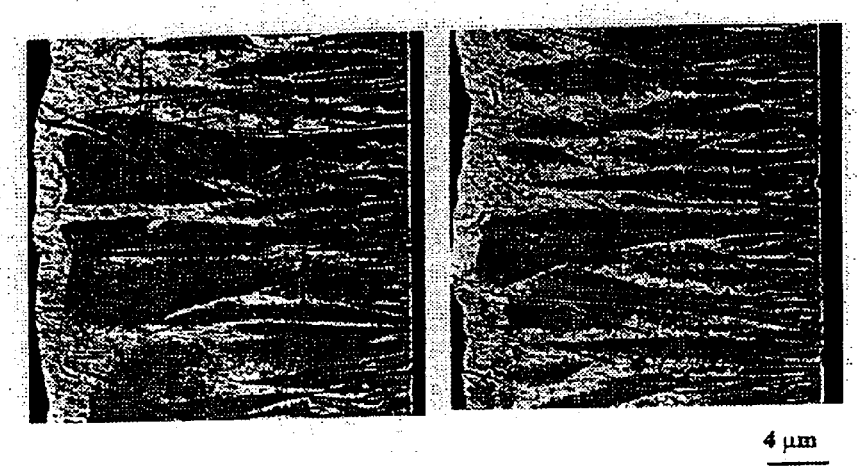
FIG. 14 is a copy of backscattered electron (BSE) images of several polished cross sections of a gold-tin alloy deposit obtained in a reproducibility test.
Figure 15:
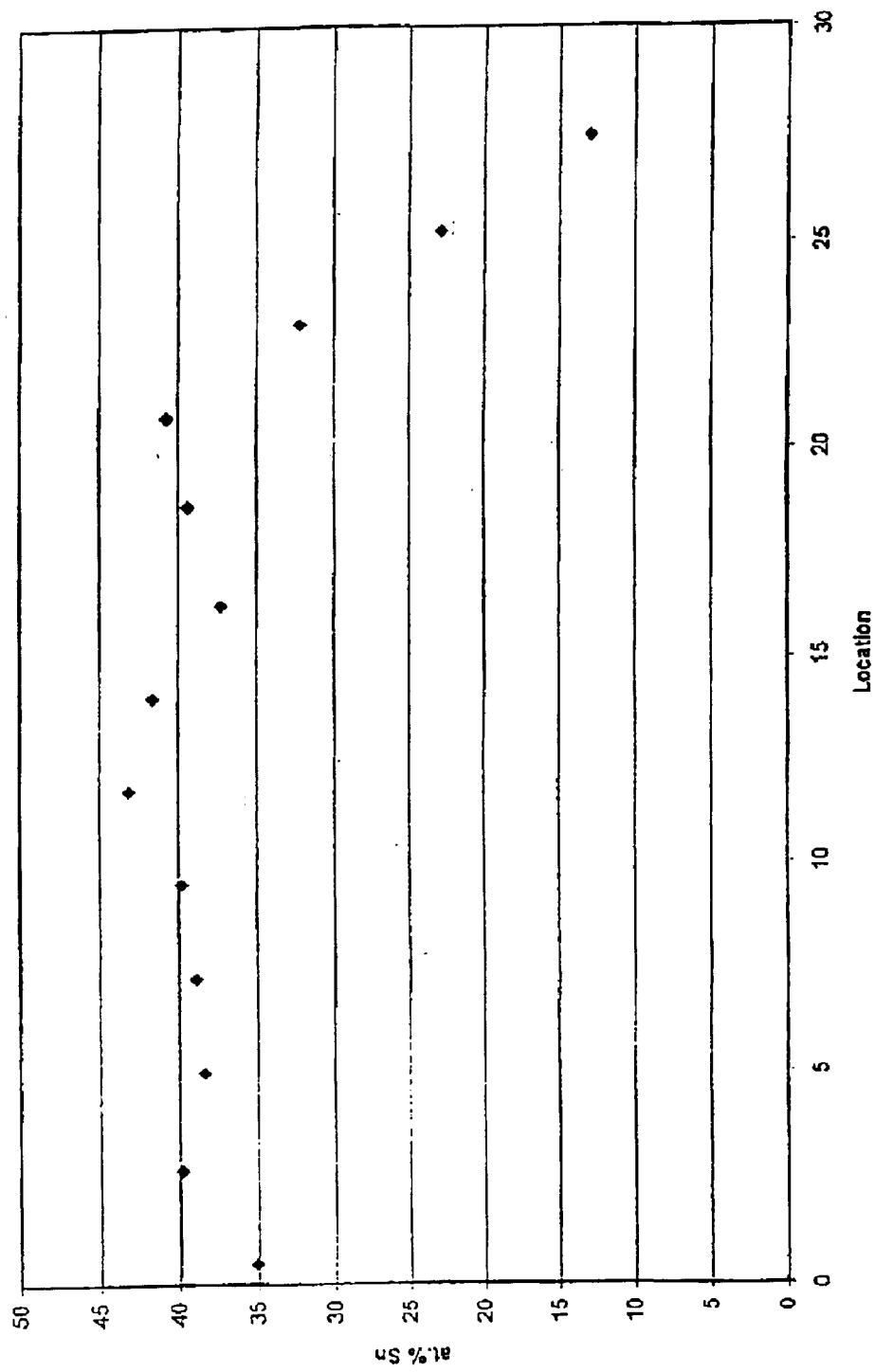
FIG. 15 is a plot showing the at % Sn content of gold-tin alloy deposits at locations across the deposit measured from the semiconductor/solder interface outwards.

SEM backscattered electron (BSE) images of polished cross sections of two regions of the deposit are shown in FIG. 14. The image contrast (due to atomic number effects) is more pronounced for the BSE images relative to the secondary electron (SE) images (FIG. 13), with the columnar behaviour clearly evident. Sn-rich regions are darker, while the lighter contrast regions are Au-rich. The BSE images show two distinct layers. The inner layer consists of two phases and is 23 μm thick, while the outer layer (2–3 μm thick) appears to be a single phase and Au-rich. The Au-rich outer layer corroborates the EDX analysis done on the surface of the deposit. Composition depth profiles (at 2.25 μm intervals) at four locations were done through the thickness of the deposit. Because of local variations in composition, due primarily to the presence of two distinctly different phases, the profiles were summed and plotted as a single profile (FIG. 15). The resultant composition profile correlates well with the cross section images, i.e., up to 22–23 μm of Au/Sn solder of uniform composition can be deposited from a single 50 ml solution.

Based on the above information, the number of InP wafers (2 inch diameter) that could be plated from the same bath without a significant composition change was estimated. If the process was scaled up to a 2 L electroplating solution and 3.5 μm of solder was deposited on each wafer, then a total of 19 wafers could be plated before replenishing the bath.

The percentage of Au in the electroplating bath consumed after plating 22 μm of solder (before the Sn content decreases) can be estimated by assuming the density of the deposit is equal to the bulk density of an equilibrium alloy consisting of Au$_5$Sn and AuSn. The total volume V of the deposit is the product of the plated area (1.46 cm$^2$) and the deposit thickness (22 μm). Since the average composition of the deposit is 39 at % Sn (28 wt % Sn), the volume percentage of Au$_5$Sn and AuSn in the deposits is approximately 35% and 65% respectively. The deposit density $\rho_d$ can be estimated from a weighted average of the densities of Au$_5$Sn and AuSn, yielding a value of 13.6 g/cm$^3$. If $g_{Au}$ is the total weight of Au added to the bath prior to plating, then the percentage of Au consumed after plating 22 μm of solder is:

$$(V\rho_d \text{ wt \% Au}_{deposit})/g_{Au} = 24 \text{ wt \%}$$

The percentage of Sn consumed can be calculated in a similar manner and amounts to 8.5 wt %. The Au content in the plating solution has changed significantly, while the Sn content has only changed a small amount.

Decreasing Sn content with increasing plating time has been addressed by Holbrom et al, who attributes it to faster Sn consumption due to the formation of Sn-rich agglomerates. This explanation is reasonable for a large current density which is close to the limiting current density. For this work, the current density is 1.6 mA/cm$^2$, which is significantly lower than the limiting current density of 4 m/cm$^2$. The change in deposit composition with plating time may instead be due to composition changes in the solution additives.

A relatively stable, non-cyanide, weakly acidic solution has been utilized to co-electroplate Au—Sn solder on metallized semiconductor substrates. Depositions were done under both DC and PC conditions and the results are summarized in the following.

In the studied range of average current density, PC deposits have consistently higher Sn content than DC deposits. At low current densities (<2.4 mA/cm$^2$), the microstructures are similar, while at higher current densities, PC deposits are finer and smoother.

For PC plating, when the average current density and cycle period are held constant, the composition vs. ON time plot a plateau. Deposits obtained at 2 ms of ON time, which is within the plateau region, have the finest and smoothest microstructure. When the peak current density and OFF time are held constant, a plateau is also observed in the deposit composition vs. ON time curve. Grain structures are finer for shorter ON times.

When the peak current density and ON time are held constant, the Sn content in the deposits first increases with increasing OFF time and then reaches a plateau. Short OFF times (3–4 ms) give coarse grained microstructures, while longer OFF times (6–9.9 ms) give consistently uniform microstructures.

Reproducibility tests indicate that several 2 inch wafers (>10) could be electroplated with Au—Sn solder (39 at % Sn) to a thickness of 3.5 µm.

During testing of the preferred gold-tin electroplating solution gold-tin solder layers ranging in thickness from submicron (100–200 nm) to several microns with compositional uniformity (compositional variations across the entire deposit of less than 5%) were obtained. Suitable deposits were obtained generally for ON times ranging from 10–40% of the duty cycle and current densities ranging from 1.6–3.6 mA/cm$^2$.

4. Electrodeposition of a Layered Composite Material in the Gold-Tin Alloy System The present invention is an extension of the work described above in Section 3 and in U.S. Pat. No. 6,245,208 (Ivey et al) and is based upon the further discovery that the gold-tin alloy phases Au$_5$Sn and AuSn can be electrodeposited selectively by varying the electroplating current, thus providing the opportunity to electrodeposit two or more alloy species in layers to produce a layered composite material.

It is noted that the general trends and principles taught by U.S. Pat. No. 6,245,208 (Ivey et al) have been confirmed by the work which has resulted in the present invention. It is also noted, however, that the further development which has led to the present invention has altered somewhat the graphical depictions of the trends observed in FIG. 2, FIG. 5, FIG. 7, FIG. 10 and FIG. 15 and discussed in Section 3 above.

Specifically, a composition plateau of about 50 at % Sn for gold-tin alloys beginning at an average current density of about 2 mA/cm$^2$ has been observed in the further work which has resulted in this invention. This plateau contrasts with the composition plateau observed in FIG. 2, FIG. 5, FIG. 7 and FIG. 10, which is at about 37–42 at % Sn and also beginning at an average current density of about 2 mA/cm$^2$.

The further work of the present invention is applicable to any alloy system in which it is possible to electrodeposit selectively two or more alloy species by varying the electroplating current.

As previously discussed, the gold-tin alloy system is a particularly desirable alloy system for use in the optoelectronic and microelectronic industries. As a result, a preferred embodiment of the present invention relates to an electrodeposition process for producing a layered composite material comprised of layers of two or more species of gold-tin alloy. A detailed description of the application of this preferred embodiment follows.

(a) Experimental Procedure

A single electroplating solution was utilized for the electrodeposition of all layers of the layered composite material, including both the Au$_5$Sn alloy phase and the AuSn alloy phase. The electroplating solution was prepared in accordance with the above description pertaining to the development of the electroplating solution and in accordance with the teachings of U.S. Pat. No. 6,245,208 (Ivey et al). In particular, the electroplating solution utilized in the testing was electroplating solution S4 (Table II).

Figure 16:
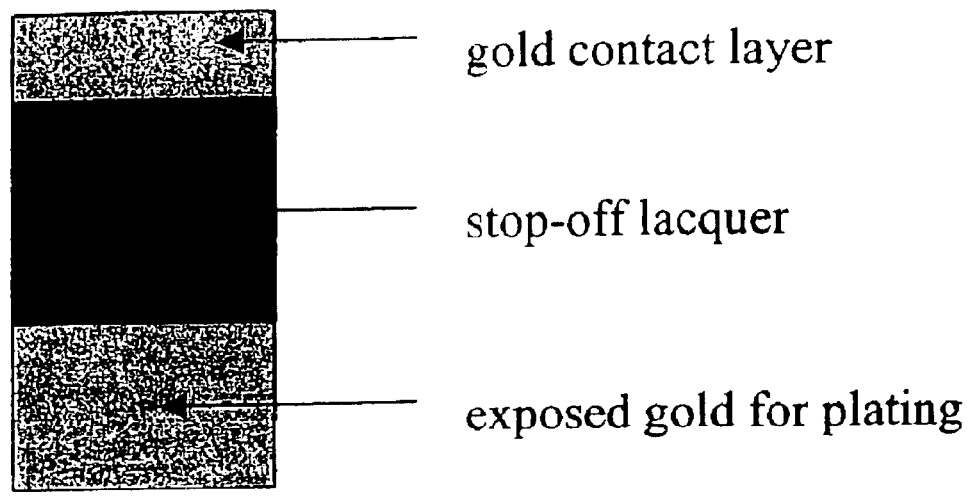
FIG. 16 is a schematic plan illustration of an electroplating substrate depicting a gold contact area, a stop-off lacquer area and an exposed gold seed layer area for plating.

All electroplating was done on an electrodeposition substrate comprising metallized Si or InP wafers with evaporated Ti and Au layers, 25 and 250 nm thick respectively. The gold provided a seed layer for electroplating, while the Ti acted as an adhesion layer between the gold and the substrate. Prior to electrodeposition, the backs of the wafers were covered completely with stop-off lacquer to prevent deposition on the rear of the wafer surface. In addition, stop-off lacquer was applied to the front of the wafer over top of the gold seed layer to isolate a portion of the wafer of known area on which the deposition could occur (FIG. 16). Generally, these areas were not in excess of 1 cm$^2$. In this way, the current density of deposition could be calculated prior to plating.

A Dynatronix DuPR 10-0.1-0.3 pulse plating capable power supply was used for electrodeposition with a maximum current rating of 100 mA average current and 300 mA peak current. Based on the previous work described above and in U.S. Pat. No. 6,245,208 (Ivey et al), which provide guidance for optimizing the quality of the gold-tin alloy deposit, the pulsed current cycle period was set at 10 ms, with a pulsed current ON time of 2 ms, and a pulsed current OFF time of 8 ms. This resulted in a 20% forward duty cycle for electroplating. Typical electroplating currents for the electroplating circuit were between 5 and 10 mA of peak current density. Plating times were usually 1.5 to 2 hours to ensure a sufficiently thick deposit (>1.5 µm) for composition analysis. A schematic of an electrodeposition setup used to test the invention is shown in FIG. 1.

For multi-layer plating, two different current densities were selected for the electroplating currents. The rationale for this is discussed below. The two current densities were then cycled to produce the separate alloy phase layers and the layered composite material. Layer thickness and composition control was achieved by adjusting the plating time used for each alloy phase.

Imaging of the layered composite material was done using a Hitachi Scanning Electron Microscope (SEM) with an energy dispersive x-ray (EDX) analysis system. Compositional analysis of all layers was done at 20 kV from a working distance of 17 cm and a count rate of 3500 counts/second. Pure Au and Sn standards were applied in order to obtain quantitative results accurate to within 2 at % Sn.

X-ray diffraction (XRD) phase analysis was carried out using a Rigaku Rotaflex rotating anode diffractometer with a thin film camera attachment. The filament voltage and current were set at 40 kV and 110 mA respectively. The sample was scanned between 10° and 90° at a rate of 1°/min using an incidence angle of 3° to ensure no substrate was sampled. A blank wafer was run for background signal comparison end elimination. Ti/Pt metallized wafers instead of Ti/Au metallized wafers were used for deposition for use in the X-ray diffraction analysis tests so that it could be determined whether or not atomic gold was being plated in addition to the gold/tin compounds.

(b) Results and Discussion (i) Relationship Between Current Density, Alloy Phase, and Composition of the Layered Composite Material A range of current densities was sampled in order to determine the effect of current density on the composition of a gold-tin alloy deposit, since adjusting the current density is the easiest and most effective method of adjusting the composition of the alloy deposit. In addition, it is important to have a firm grasp on the types of alloy deposits that can be produced using this method (i.e., solid solutions with impurity levels of Sn, or actual alloy compounds with significant Sn content).

Figure 17:
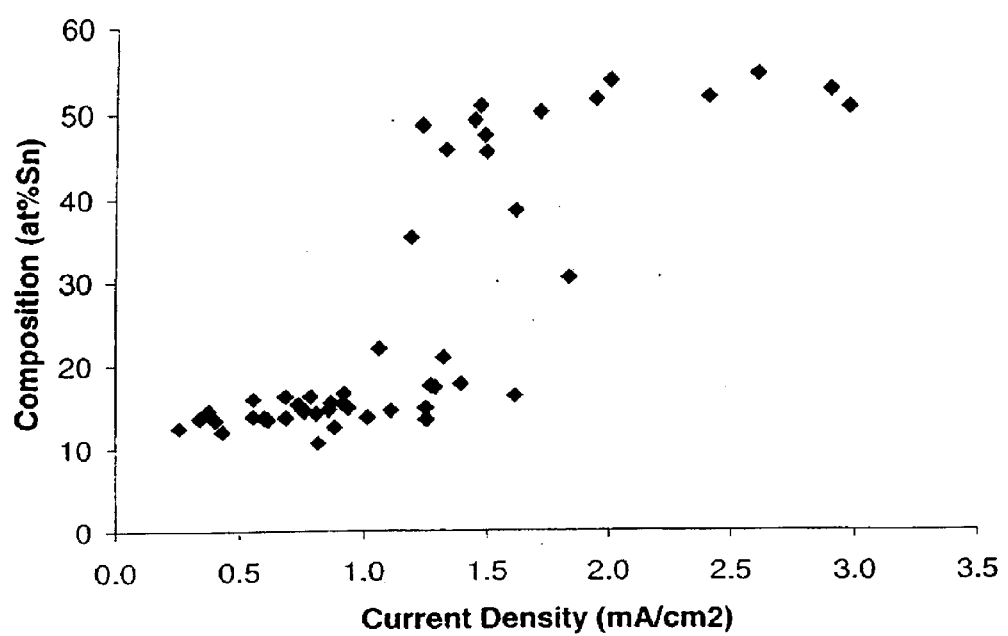
FIG. 17 is a plot showing the at % Sn content of gold-tin alloy deposits obtained at different values of average current density.
Figure 18:
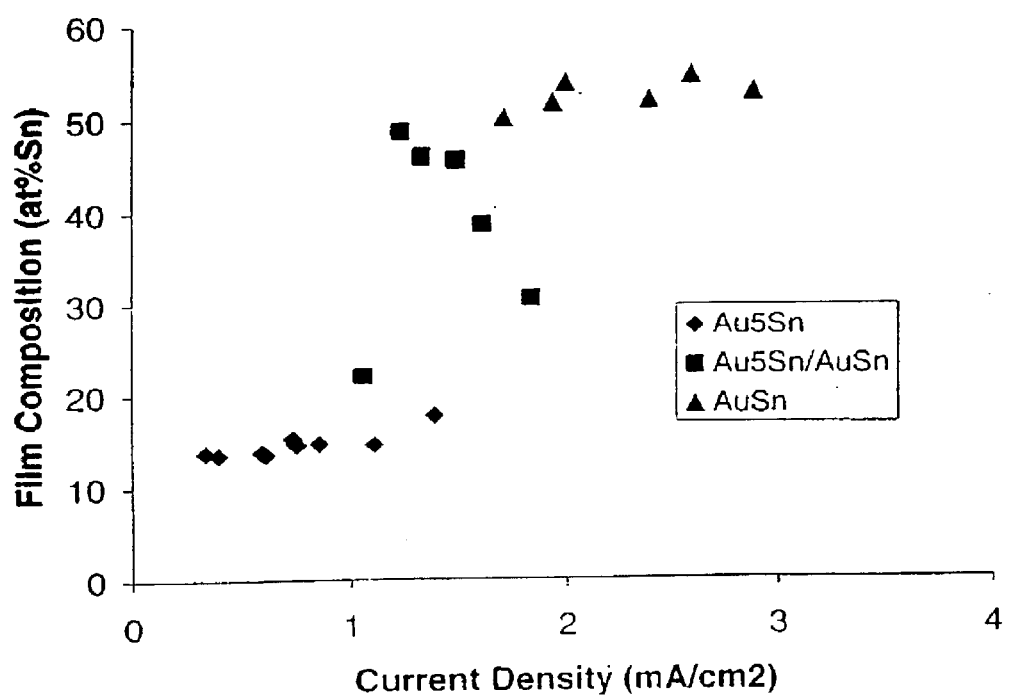
FIG. 18 is a plot showing the at % Sn content of alloy deposits containing $Au_5Sn$, AuSn and mixtures thereof as obtained at different values of average current density.

The previous work from U.S. Pat. No. 6,245,208 (Ivey et al) had already established the existence of a composition plateau at about 37–42 at % Sn in the current density range from about 2.0 to about 3.5 mA/cm$^2$. Building on this work, a composition plateau at 50 at % Sn was observed through additional testing beginning at about 2 mA/cm$^2$. A lower composition plateau was also found at an average Sn composition of 15 at % Sn extending up to about 1 mA/cm$^2$. Between about 1 mA/cm$^2$ and about 2 mA/cm$^2$ there was observed a transition region where the composition of the alloy deposit is variable with the current density. These trends are illustrated in FIG. 17 and FIG. 18.

Since two plateaus exist, it is realistic to assume that within these plateaus, a single alloy species or even a single alloy phase is being deposited in each plateau accounting for the constant Sn composition. XRD analysis was performed in order to identify the alloy phases present and also to validate the EDX analysis. FIG. 18 shows the results of the XRD analysis. The XRD testing verified the existence of the AuSn phase within the 50 at % Sn composition plateau and the existence of the Au$_5$Sn phase within the lower plateau at 15 at % Sn.

The gold-tin alloy phase Au$_5$Sn may exist in either an ordered phase or a disordered phase. Based upon XRD and electron diffraction analyses, Au$_5$Sn deposited within the 15 at % Sn composition plateau has been identified as the disordered phase. Within the transition region, both alloy phases Au$_5$Sn and AuSn are deposited.

Figure 19A:
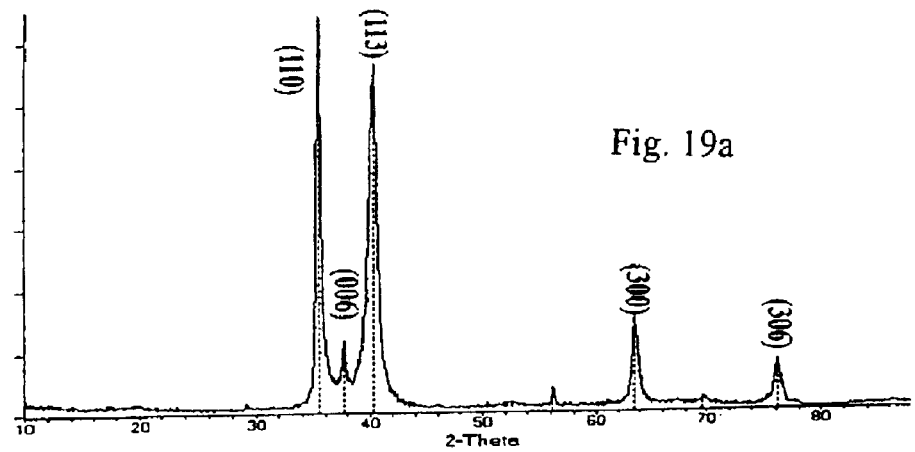
FIG. 19(a) through FIG. 19(c) are diffraction patterns showing spectra obtained from the $Au_5Sn$ region, the AuSn region and the $Au_5Sn$—AuSn region as depicted in FIG. 18.
Figure 19B:
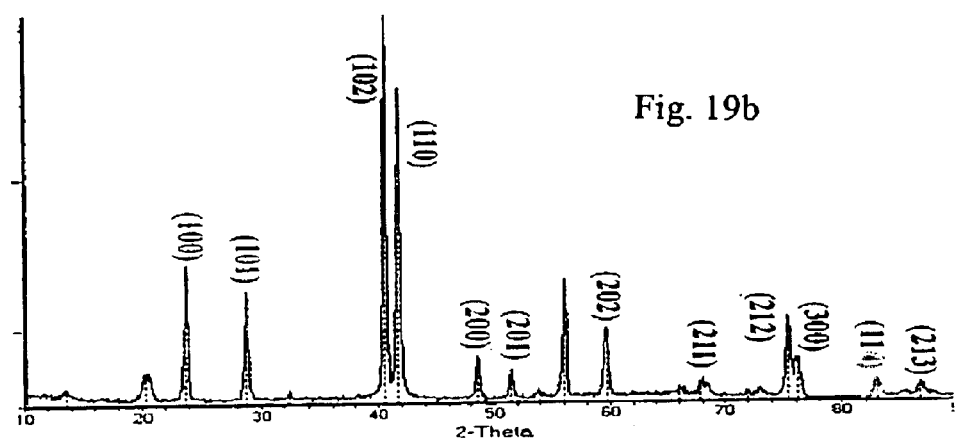
Figure 19C:
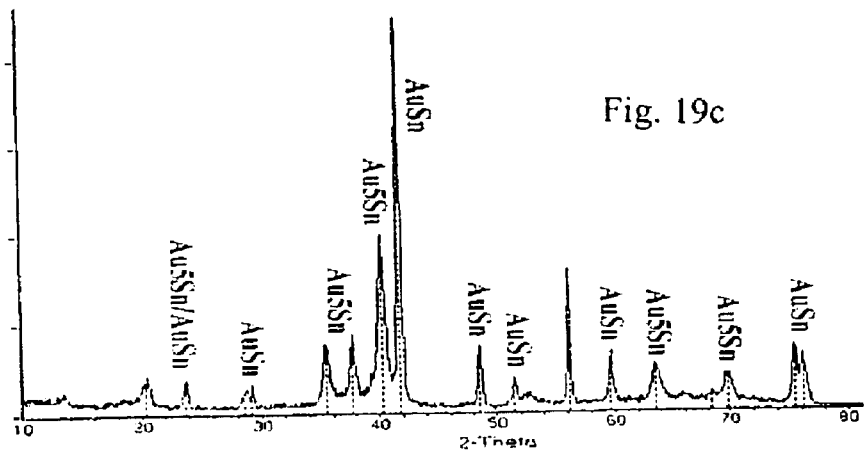

FIG. 19(a) through FIG. 19(c) show examples of the diffraction patterns obtained from each of the three regions. FIG. 19(a) is a spectrum for Au$_5$Sn from a deposit done at an average current density of 0.8 mA/cm$^2$ with an average composition of 15 at % Sn. FIG. 19(b) is a spectrum for the AuSn phase from a deposit done at an average current density of 1.94 mA/cm$^2$ with an average composition of 52 at % Sn and FIG. 19(c) is a spectrum showing the two alloy phases from a deposit done at an average current density of 1.33 mA/cm$^2$ and a composition of 46 at % Sn.

Using the Au/Sn phase diagram shown in FIG. 20 as a guide, it is reasonable that the composition plateau at 50 at % Sn would correspond to the AuSn or δ intermetallic phase. In addition, it is probable that the lower plateau at 15 at % Sn would correspond to the Au$_5$Sn phase.

As seen in FIG. 20 there are two Au$_5$Sn phases, the ordered ζ and the disordered ζ. The ordered phase is an intermetallic compound with a composition of 16.7 at % Sn and a homogeneity range of less than 1 at % Sn. It has a close packed-hexagonal structure with the unit cell of the superstructure containing 15 Au and 3 Sn atoms. The lattice parameters a and c are 0.5092 nm and 1.4333 nm respectively. The disordered phase, however, extends between 9.1 at % Sn and 17.6 at % Sn at 280° C. but is not considered to be stable at room temperature. It is a Mg-type close-packed hexagonal lattice structure with variable lattice constants depending upon composition. For composition varying from 11.07 to 16.31 at % Sn, the lattice constant a changes from 0.29084 nm to 0.29386 nm and c changes from 0.47864 nm to 0.47694 nm.

The presence of the disordered phase of Au$_5$Sn in the 15 at % Sn composition plateau would therefore account for both the off-stoichiometric average composition, 15 at % Sn instead of 16.7 at % Sn, and the significant scatter in the compositional data (FIG. 17) with values ranging from 13 at % Sn to 17 at % Sn.

The XRD work verifies that there is both a compositional and phase plateau from 2 to 3 mA/cm$^2$ and a separate compositional and phase plateau up to 1 mA/cm$^2$. As suspected, there is a mixture of the two alloy phases (AuSn and Au$_5$Sn) deposited within the transition region accounting for the significant variability in composition.

FIG. 17 and FIG. 18 can be most easily explained by examining the behavior of the individual metal ions in solution. In general, Au is more noble metal than Sn. Even with the addition of the sulphite as a complexing agent to bring the potentials of the two metals closer together, the Au will remain more noble relative to the Sn although the new potential difference between the two metals as a result of complexing is unknown. As a result, the Au will still tend to deposit more readily than the Sn.

At the lower current densities, or lower applied over-potentials, the Au, tending to reduce more easily than the Sn, will be in greater concentration on the wafer surface. Since a greater concentration of Au is depositing compared with Sn, the formation of the Au-rich compound, Au$_5$Sn, occurs. As the current density increases, the over-potential of both the Sn and the Au increases as well. At higher current densities, 2–3 mA/cm$^2$, it is assumed that the reduction of Au ions has reached its limiting current density and is therefore reacting on the surface at a constant rate. The increase in over-potential, however, increases the deposition of Sn and since the Au deposition remains fixed, the Sn/Au ratio on the wafer surface increases. As a result, Au$_5$Sn is no longer the preferred phase for electrodeposition. The next possible phase for deposition, as seen from the Au/Sn phase diagram in FIG. 20, is AuSn. This results in the AuSn plateau seen in FIG. 17 and FIG. 18.

The two-phase transition region represents an intermediate condition to the two cases discussed above. Local variations in current density may favour nucleation of one alloy phase over the other, resulting in the formation of both alloy phases. It is possible that local variations in microstructure, protrusions for example, may provide a sufficient local increase in over potential causing AuSn to become the more favorable compound for deposition in those regions. However, in areas when the over-potential is not increased by the layer morphology, the ratio of ions reacting at the wafer surface will remain more conducive for depositing Au$_5$Sn. As a result, it becomes possible to deposit both phases in this transition region.

The determination of the two composition plateaus, one at 50 at % Sn and one at 15 at % Sn means that the appropriate combination of these phases will result in the eutectic composition or, for that matter, any composition between 15 at % and 50 at %. In a sense, the current density/composition graph (FIG. 17) mimics the structure of the phase diagram. Referring to FIG. 20, the 10 to 50 at % Sn region is bordered by the two phases, Au$_5$Sn and AuSn, separated by a mixed phase region. This is mimicked in the current density/composition relationship where the two phases make up the boundaries of the plating curve separated by a two-phase transition region that includes the eutectic composition.

(ii) Layer Structure and Morphology

Figure 21A:
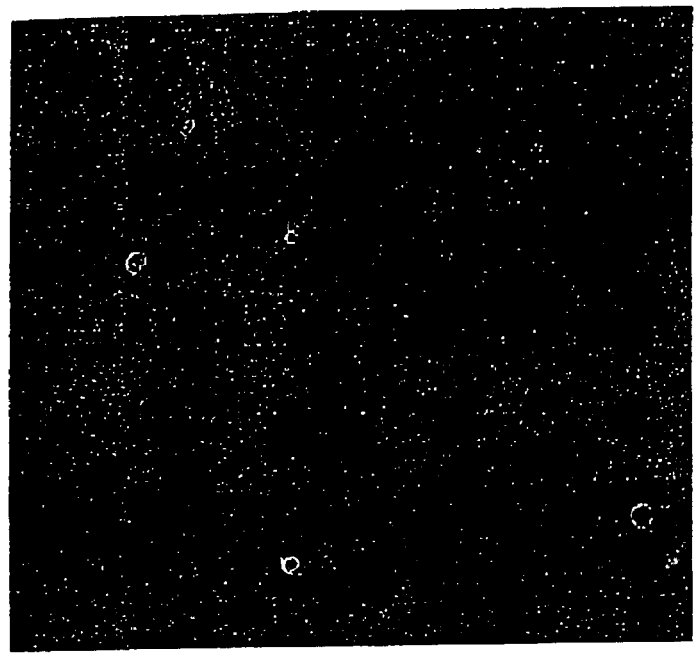
FIG. 21(a) and FIG. 21(b) are SEM top view images of an $Au_5Sn$ alloy phase deposit and an AuSn alloy phase deposit respectively.
Figure 21B:
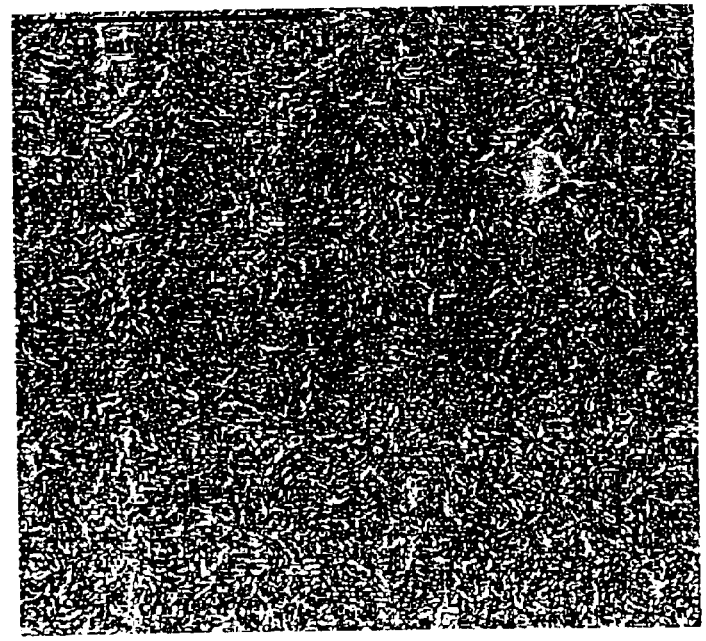

Within each composition plateau, there are two distinctly different deposit structures. FIG. 21(a) and FIG. 21(b) are SEM top view images of an Au$_5$Sn alloy phase deposit and an AuSn alloy phase deposit respectively as prepared in accordance with the invention. In FIG. 21(a), the surface of the Au$_5$Sn alloy phase deposit appears smooth and shiny with a mirror-like reflective quality and very little structure is apparent. In FIG. 21(b), the surface of the AuSn alloy phase deposit produced appears gray, dull, and rougher. Further examination of the deposit structures using transmission electron microscopy reveals, however, that the grain structure for the AuSn alloy phase is actually less coarse than the grain structure for the Au$_5$Sn alloy phase. This finding is consistent with the general trend that grain structure typically becomes less coarse as current density increases (up to a limiting current density).

(iii) Production of a Layered Composite Material

Once the two separate gold-tin alloy composition plateaus at 15 at % Sn and 50 at % Sn were established, further testing was directed at multi-layer electrodeposition of the two different alloy phases in order to obtain a layered composite material having the desired eutectic composition of 30 at % Sn overall or any composition desired between 15 and 50 at % Sn.

Having established that the Au$_5$Sn and AuSn alloy phases could be deposited individually, testing was conducted to confirm that it was possible to combine the two alloy phases in different layers of a layered composite material to achieve a desired composite material composition.

Figure 22:
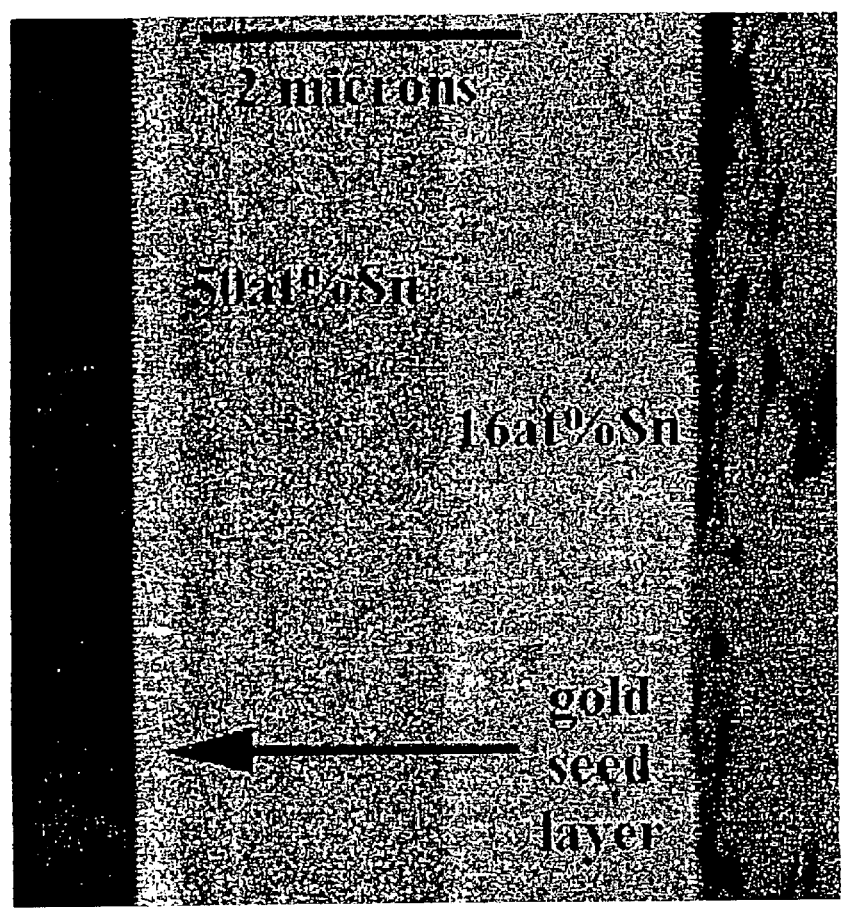
FIG. 22 is a BSE image of layers of a gold-tin alloy deposit showing a layer of the $Au_5Sn$ alloy phase and a layer of the AuSn alloy phase on top of a gold seed layer.

A first multi-layer test was directed at depositing a layer of one alloy phase on top of a layer of the other alloy phase to establish compatibility. The first layer deposited was AuSn (50 at % Sn), with the Au$_5$Sn layer (15 at % Sn) on top. An average current density of 0.8 mA/cm$^2$ was chosen for the Au$_5$Sn alloy phase deposition, since it was near the upper end of the lower plateau and gave a higher plating rate. An average current density of 2.4 mA/cm$^2$ was chosen for the AuSn alloy phase deposition, since this current density has been shown in the previous work described above to provide a fairly rapid deposition rate coupled with a relatively fine-grained structure. The resulting layered composite material is shown in FIG. 22, in which backscattered electron (BSE) imaging was used to enhance atomic number contrast. FIG. 22 clearly shows that both layers are extremely uniform with good adhesion to one another. Of particular importance is the apparent lack of voids along the interface between the alloy phases suggesting excellent integration of the two layers.

Figure 23A:
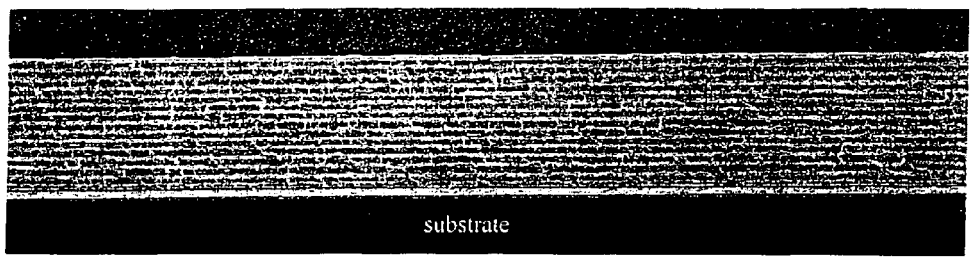
FIG. 23(a) is a low magnification BSE image of a gold-tin alloy layered composite material comprising a plurality of layers of each of the $Au_5Sn$ alloy phase and the AuSn alloy phase in which the first current plating time interval is 21 minutes and the second current plating time interval is 5 minutes.
Figure 23B:
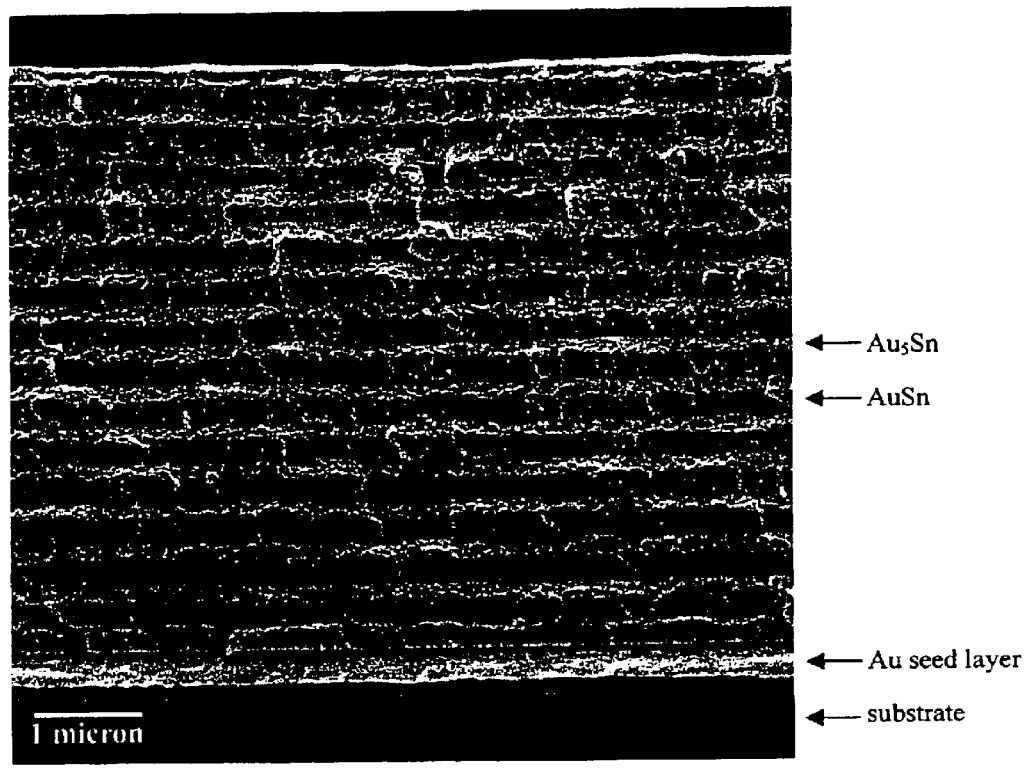
FIG. 23(b) is a high magnification BSE image of a gold-tin alloy layered composite material comprising a plurality of layers of each of the $Au_5Sn$ alloy phase and the AuSn alloy phase in which the first current plating time interval is 21 minutes and the second current plating time interval is 5 minutes.

A second multi-layer test was directed at electrodepositing a repeating sequence of much thinner alloy phase layers than were deposited in the first test in order to produce a layered composite material comprising a plurality of layers of each of the Au$_5$Sn alloy phase and the AuSn alloy phase. FIG. 23(a) is a low magnification BSE image and FIG. 23(b) is a high magnification BSE image, both showing a cross-section of a layered composite material produced by electroplating at an average current density of 2.4 mA/cm$^2$ for 5 minutes, followed by electroplating at an average current density of 0.8 mA/cm$^2$ for 21 minutes. This cycle was repeated several times to build up the layered composite material. A pulse cycle period of 2 ms ON time and 8 ms OFF time was maintained. The overall composite material composition of the layered composite material is 35 at % Sn.

In the two tests described above, the average current density was changed manually. In future tests and for commercial production purposes, the process could be automated to allow for much shorter plating time intervals to deposit extremely thin multiple layers (<10 nm) of Au$_5$Sn and AuSn to produce essentially a completely or nearly completely interspersed structure of eutectic or near-eutectic composition.

The testing described above was directed at utilizing current densities within the lower composition plateau and the upper composition plateau so that either Au$_5$Sn or AuSn would be electrodeposited in any single layer of the layered composite material. The primary reason for working within the composition plateaus is that the composition plateaus represent relatively forgiving ranges of current densities within which the composition of the electrodeposited alloy species is consistent and relatively easy to control. For commercial production purposes, the ability to work within ranges of current densities provides for quality assurance, since the composite material composition of the layered composite material is not dependent upon precise control over the current densities utilized in the process.

The teachings of the present work, however, could be applied to a single layer process for producing an alloy deposit of a single alloy species by utilizing a single current density which is within the transition region between the composition plateaus. The composition of the alloy species could be controlled by controlling the current density within the transition region and by interpolation between the composition plateaus. Although technically feasible, this approach to applying the teachings of the present work is potentially less commercially feasible than the preferred approach of producing a layered composite material comprising discrete layers of alloy species within the composition plateaus, due to the potential difficulties in maintaining sufficient precise control over the current density which is utilized and due to the somewhat unpredictable effects of local variations in deposit microstructure, edge effects, and other local effects which may affect the overall composition of the alloy deposit.

It has therefore been shown that by altering current density, it is possible to electrodeposit two or more different alloy species to produce a layered composite material comprising layers of the different alloy species. The composite material composition of the layered composite material may be controlled by controlling both the plating time intervals for the various layers and the number of layers deposited.

In the preferred embodiment relating to the gold-tin alloy system, the invention may be used to produce a layered composite material containing separate layers of the Au$_5$Sn alloy phase and the AuSn alloy phase and having a composite material composition of between 15 at % Sn and 50 at % Sn.

Having described the invention, modifications will be evident to those skilled in the art without departing from the scope of the invention as defined in the appended claims.

The embodiments of the invention in which an exclusive property or privilege is claimed are defined as follows:

1. A layered composite material comprising a layer of a first alloy species of an alloy, the first alloy species having first alloy species properties and consisting essentially of a first alloy phase, and further comprising a layer of a second alloy species of the alloy, the second alloy species having second alloy species properties and consisting essentially of a second alloy phase, wherein the first alloy species properties are distinguishable from the second alloy species properties, wherein the alloy is comprised of gold and tin, wherein the first alloy phase is Au$_5$Sn and the second alloy phase is AuSn and wherein the layered composite material is comprised of a plurality of layers of each of the first alloy species and the second alloy species.

2. The layered composite material as claimed in claim 1 wherein the first alloy phase has a first alloy phase composition, wherein the second alloy phase has a second alloy phase composition, and wherein the first alloy phase composition is different from the second alloy phase composition.

3. The layered composite material as claimed in claim 2 wherein the material has a composite material composition and wherein the composite material composition is comprised of between about 25 at % tin and about 40 at % tin.

4. The layered composite material as claimed in claim 3 wherein the composite material composition is comprised of between about 27 at % tin and about 35 at % tin.

5. The layered composite material as claimed in claim 4 wherein the composite material composition is comprised of about 30 at % tin.

6. The layered composite material as claimed in claim 4 wherein the composite material composition is a eutectic composition.

* * * * *